US007390866B2

(12) United States Patent  
Datta et al.

(10) Patent No.: US 7,390,866 B2  
(45) Date of Patent: Jun. 24, 2008

(54) PROPYLENE-BASED ELASTOMERS AND USES THEREOF

(75) Inventors: Sudhin Datta, Houston, TX (US); Rul Zhao, Houston, TX (US); Srivatsan Srinivas, Pearland, TX (US); Majia Y Amin, Friendswood, TX (US); Periagaram S Ravishankar, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 248 days.

(21) Appl. No.: 10/988,161

(22) Filed: Nov. 12, 2004

(65) Prior Publication Data

US 2005/0107534 A1 May 19, 2005

Related U.S. Application Data

(60) Provisional application No. 60/519,975, filed on Nov. 14, 2003.

(51) Int. Cl.
C08F 236/02 (2006.01)
(52) U.S. Cl. .................. 526/339; 526/282; 526/283; 526/336; 524/554; 524/581
(58) Field of Classification Search ............... 526/282, 526/336, 339, 283; 524/554, 581
See application file for complete search history.

(56) References Cited

U.S. PATENT DOCUMENTS

| | | | |
|---|---|---|---|
| 4,311,628 A | 1/1982 | Abdou-Sabet et al. | 260/33.6 AQ |
| 4,603,158 A | 7/1986 | Markham et al. | |
| 5,229,478 A | 7/1993 | Floyd et al. | 526/160 |
| 5,290,886 A | 3/1994 | Ellul | 524/515 |
| 5,324,576 A | 6/1994 | Reed et al. | |
| 5,656,693 A | 8/1997 | Ellul et al. | 525/171 |
| 6,207,756 B1 | 3/2001 | Datta et al. | 525/191 |
| 6,245,856 B1 | 6/2001 | Kaufman et al. | 525/240 |
| 6,265,493 B1 | 7/2001 | Chung et al. | 525/247 |
| 6,319,998 B1 | 11/2001 | Cozewith et al. | 526/65 |
| 6,329,477 B1 | 12/2001 | Harrington et al. | 526/65 |
| 6,342,565 B1 | 1/2002 | Cheng et al. | 525/191 |
| 6,388,016 B1 | 5/2002 | Abdou-Sabet et al. | 525/194 |
| 6,525,157 B2 | 2/2003 | Cozewith et al. | 526/348 |
| 2001/0008695 A1 | 7/2001 | Bolton et al. | |
| 2001/0047069 A1 | 11/2001 | Chung et al. | 526/336 |
| 2003/0236852 A1 | 12/2003 | Fernandes et al. | |
| 2004/0241360 A1 | 12/2004 | Giblin et al. | |
| 2005/0107529 A1* | 5/2005 | Datta et al. | 525/70 |
| 2005/0107534 A1 | 5/2005 | Datta et al. | |
| 2005/0131142 A1 | 6/2005 | Datta et al. | |
| 2005/0234172 A1 | 10/2005 | Musgrave et al. | |

FOREIGN PATENT DOCUMENTS

| | | |
|---|---|---|
| EP | 0 401 993 | 12/1990 |
| EP | 0 844 278 | 5/1998 |
| EP | 964641 | 7/1998 |
| EP | 946640 | 10/1999 |
| EP | 1003814 | 5/2000 |
| EP | 946640 | 2/2002 |
| EP | 1003814 | 10/2002 |
| GB | 1238419 | 7/1971 |
| WO | WO 98/27155 | 6/1998 |
| WO | 1998/31283 | 7/1998 |
| WO | WO9831283 | 7/1998 |
| WO | 2000/69963 | 11/2000 |
| WO | 2000/69964 | 11/2000 |
| WO | WO00/69963 | 11/2000 |
| WO | WO00/69964 | 11/2000 |
| WO | 2002/34795 | 5/2002 |
| WO | WO02/34795 | 5/2002 |
| WO | 2002/051928 | 7/2002 |
| WO | WO2002051928 | 7/2002 |

OTHER PUBLICATIONS

U.S. Appl. No. 10/987,670, filed Nov. 12, 2004, entitled "Articles Comprising Propylene-Based Elastomers", Datta et al.

U.S. Appl. No. 10/987,794, filed Nov. 12, 2004, entitled "Transparent and Translucent Crosslinked Propylene-Based Elastomers, and Their Production and Use", Datta et al.

U.S. Appl. No. 10/988,162, filed Nov. 12, 2004, entitled "High Strength Propylene-Based Elastomers and Uses Thereof", Datta et al.

U.S. Appl. No. 10/987,670, filed Nov. 12, 2004, entitled "Articles Comprising Propylene-Based Elastomers", Datta et al.(2003B121A).

U.S. Appl. No. 10/987,794, filed Nov. 12, 2004, entitled "Transparent and Translucent Crosslinked Propylene-Based Elastomers, and Their Production and Use", Datta et al.(2003B121B).

U.S. Appl. No. 10/988,162, filed Nov. 12, 2004, entitled "High Strength Propylene-Based Elastomers and Uses Thereof", Datta et al.(2003B121C).

* cited by examiner

Primary Examiner—Fred M Teskin

(57) ABSTRACT

The present invention provides curable and cured propylene-based elastomers, optionally including a diene, and having isotactic polypropylene crystallinity, a melting point by DSC equal to or less than 110° C., and a heat of fusion of from 5 J/g to 50 J/g. The present invention also provides blend compositions comprising any of the propylene-based elastomers described herein. The present invention also provides compositions comprising any of the propylene-based elastomers described herein and 1 to 100 parts by weight of inorganic filler per 100 parts of polymer. The present invention also provides films, fibers, fabrics, molded objects, and extruded forms which include any of the inventive compositions described herein.

15 Claims, No Drawings

PROPYLENE-BASED ELASTOMERS AND USES THEREOF

This application claims the benefit of U.S. Provisional Application No. 60/519,975, filed Nov. 14, 2003, the entire disclosure of which is hereby incorporated herein by reference.

FIELD OF THE INVENTION

The present invention is directed generally to elastomeric compositions having isotactic polypropylene crystallinity, a melting point by DSC of 110° C. or less, a heat of fusion of from 5 to 50 J/g, and comprising at least 60 wt % propylene-derived units, at least 6 wt % ethylene-derived units, and optionally diene-derived units. Embodiments of the invention include curable and cured elastomeric compositions, and the use of such compositions in applications such as fibers, films, fabrics, and molded objects.

BACKGROUND

Amorphous and partially crystalline (generally referred to as semi-crystalline) polymers can provide elastomeric properties as defined, for example, in ASTM D1566. An important class of elastomers is derived from polyolefins, generally using addition polymerization with a Ziegler-Natta type catalyst system. Currently, polyolefin elastomers are interpolymers of ethylene, a crystallinity-disrupting α-olefin such as propylene, which provides short chain branches, and optionally small amounts of a polyene, such as a diene, to provide unsaturated short chain branches useful in providing crosslinks between different chains. These interpolymers may be ethylene propylene copolymers (EP) not containing units derived from diene, or ethylene propylene diene terpolymers (EPDM).

Different technologies exist for curing EP and EPDM interpolymers. Curing can proceed progressively from an initial creation of long chain branches where a macromer or polymer chain inserts itself along the length of an already formed polymer, to an intermediate form in which the cured polymer is partly soluble and partly insoluble, to a fully cured form in which the bulk of it is insoluble and all polymer chains are linked into a network and no isolated polymer chains remain for individual extraction.

A person skilled in the art selects the interpolymer, the curing/crosslinking systems, and other formulation ingredients to balance processability and physical properties of the final product such as aging, hardness, extensability, compression set, tensile strength, and performance when cold.

EP 964641, EP 946640, EP 1003814, U.S. Pat. Nos. 6,245,856, and 6,525,157, and others disclose polyolefin interpolymers that are elastomers and have crystallinity formed by isotactically-arranged propylene-derived sequences in the polymer chain. This is in contrast with the EP and EPDM interpolymers in current commercial use whose crystallinity is due to ethylene-derived sequences. The properties of such propylene-based elastomers are different in many aspects from known EP and EPDM interpolymer elastomers. Use of dienes for these new propylene-based elastomers has been contemplated. See, for example, WO 00/69964, including at page 15, lines 18 to 25.

Other background references include PCT Publications WO00/69963 and WO00/69964.

SUMMARY OF THE INVENTION

In one aspect, the invention provides propylene-based elastomers which are cured to various degrees so as to further enlarge the elastomeric performance envelope of the elastomers and permit convenient processing.

In another aspect, the improved propylene-based elastomer includes a diene to facilitate curing and optimal end use performance in various options of formulation and processing.

In another aspect, the invention provides an improved formulation containing such propylene-based elastomer to provide appearance and end use performance characteristics not achievable with EP and EPDM interpolymer elastomers.

In one embodiment, the invention provides an elastomer including propylene-derived units, ethylene-derived units, and diene-derived units, and having isotactic polypropylene crystallinity, a melting point by DSC equal to or less than 110° C., and a heat of fusion of from 5 J/g to 50 J/g. The propylene-derived units are present in an amount of at least 60 wt %, based on the combined weight of units derived from propylene, diene, and ethylene. The ethylene-derived units are present in an amount of at least 6 wt %, based on the combined weight of units derived from propylene, diene, and ethylene. The diene-derived units are present in an amount within the range of from 0.3 to 10 wt %, based on the combined weight of units derived from propylene, diene, and ethylene.

In another embodiment, the invention provides a curable composition comprising a propylene-based elastomer as described herein and a curing package.

In another embodiment, the invention provides a cured composition in which a curable composition as described herein is cured to a degree such that the viscosity ratio of the elastomer is from 1 to 10.

In another embodiment, the invention provides a cured composition in which a curable composition as described herein is cured to a degree such that at least 2 wt % of the elastomer is cured as determined by the extraction method described herein.

In another embodiment, the invention provides a process for making an extruded article, the process comprising extruding a curable composition as described herein to produce an extruded article, and exposing the extruded article to a cure treatment, such as chemical crosslinking or irradiation, so as to provide the extruded article having a composition according to a cured composition as described herein.

In another embodiment, the invention provides a film, fiber, fabric, molded object, or extruded form which includes any of the inventive compositions described herein.

DETAILED DESCRIPTION

Propylene-based Elastomer

The propylene-based elastomer of the present invention is a random propylene homopolymer or copolymer having crystalline regions interrupted by non-crystalline regions. The non-crystalline regions may result from regions of non-crystallizable polypropylene segments and/or the inclusion of comonomer units. The crystallinity and the melting point of the propylene-based elastomer are reduced compared to highly isotactic polypropylene by the introduction of errors in the insertion of propylene and/or by the presence of comonomer.

The crystallinity of the propylene-based elastomer may be expressed in terms of heat of fusion. In particular embodiments, the propylene-based elastomer has a heat of fusion, as determined by DSC, ranging from a lower limit of 1.0 J/g, or 1.5 J/g, or 3.0 J/g, or 4.0 J/g, or 6.0 J/g, or 7.0 J/g, to an upper limit of 30 J/g, or 40 J/g, or 50 J/g, or 60 J/g, or 75 J/g.

The crystallinity of the propylene-based elastomer can also be expressed in terms of crystallinity percent. The thermal energy for the highest order of polypropylene is estimated at 189 J/g. That is, 100% crystallinity is equal to 189 J/g. Therefore, in particular embodiments, the propylene-based elastomer has a propylene crystallinity within the range having an upper limit of 65%, or 40%, or 30%, or 25%, or 20%, and a lower limit of 1%, or 3%, or 50%, or 7%, or 8%.

The level of crystallinity is also reflected in the melting point. The term "melting point," as used herein is the highest peak among principal and secondary melting peaks, as determined by DSC. In particular embodiments, the propylene-based elastomer has a melting point by DSC ranging from an upper limit of 110° C., or 105° C., or 90° C., or 80° C., or 70° C. to a lower limit of 0° C., or 20° C., or 25° C., or 30° C., or 35° C., or 40° C., or 45° C.

The propylene-based elastomer generally comprises at least 60 wt % propylene-derived units, and in particular embodiments, the propylene-based elastomer comprises at least 75 wt %, or at least 80 wt %, or at least 90 wt % propylene-derived units.

Propylene-based elastomers suitable in the present invention have an isotactic propylene triad tacticity within the range having a lower limit of 65%, or 70%, or 75% to an upper limit of 95%, or 97%, or 98%, or 99%. The isotactic propylene triad tacticity of a polymer is the relative tacticity of a sequence of three adjacent propylene units, a chain consisting of head to tail bonds, expressed as a binary combination of m and r sequences. The isotactic propylene triad tacticity of the polymers disclosed herein was determined using $C^{13}$NMR and the calculations outlined in U.S. Pat. No. 5,504,172.

The propylene-based elastomer of the invention has an isotacticity index greater than 0%, or within the range having an upper limit of 50%, or 25% and a lower limit of 3%, or 10%.

The propylene-based elastomer of the invention has a tacticity index (m/r) within the range having an upper limit of 8, or 10, or 12, and a lower limit of 4, or 6.

In some embodiments, the crystallinity of the propylene-based elastomer is reduced by the copolymerization of propylene with limited amounts of one or more comonomers selected from: ethylene, $C_4$-$C_{20}$ alpha-olefins, and polyenes. In these copolymers, the amount of propylene-derived units present in the propylene-based elastomer ranges from an upper limit of 99.9 wt %, or 97 wt %, or 95 wt %, or 94 wt %, or 92 wt %, or 90 wt %, or 85 wt % to a lower limit of 60 wt %, 68 wt %, or 70 wt %, or 71 wt %, or 75 wt %, or 76 wt %, or 80 wt %, based on the total weight of the propylene-based elastomer. The amount of optional units derived from ethylene and/or $C_4$-$C_{20}$ alpha-olefins present in the propylene-based elastomer ranges from an upper limit of 40 wt %, or 35 wt %, or 30 wt %, or 28 wt %, or 25 wt %, or 20 wt %, or 15 wt % to a lower limit of 0 wt %, or 0.5 wt %, or 1 wt %, or 2 wt %, or 3 wt %, or 5 wt %, or 6 wt %, or 8 wt %, or 10 wt %, based on the total weight of the propylene-based elastomer. The amount of optional polyene-derived units present in the propylene-based elastomer ranges from an upper limit of 25 wt %, or 20 wt %, or 15 wt %, or 10 wt %, or 7 wt %, or 5 wt %, or 4.5 wt %, or 3 wt %, or 2.5 wt %, to a lower limit of 0 wt %, or 0.1 wt %, or 0.2 wt %, or 0.3 wt %, or 0.5 wt %, or 1 wt %, or 1.5 wt % based on the total weight of the propylene-based elastomer.

Non-limiting examples of preferred a-olefin(s) optionally present in the propylene-based elastomer include propylene, 1-butene, 1-pentene, 1-hexene, 1-octene, and 1-dodecene. The polyene-derived units optionally present in the propylene-based elastomer may be derived from any hydrocarbon structure having at least two unsaturated bonds wherein at least one of the unsaturated bonds may be incorporated into a polymer. Non-limiting examples of preferred polyenes include 5-ethylidene-2-norbornene ("ENB"), 5-vinyl-2-norbornene ("VNB"), divinyl benzene ("DVB"), and dicyclopentadiene ("DCPD").

In a particular embodiment, the propylene-based elastomer has a Mooney viscosity ML(1+4) at 125° C. of from 0.5 to 100, or from 5 to 40, or from 10 to 40.

The propylene-based elastomer of the invention has a weight average molecular weight ($M_w$) within the range having an upper limit of 5,000,000 g/mol, or 1,000,000 g/mol, or 500,000 g/mol, and a lower limit of 10,000 g/mol, or 15,000 g/mol, or 20,000 g/mol, or 80,000 g/mol, and a molecular weight distribution $M_w/M_n$ (MWD), sometimes referred to as a "polydispersity index" (PDI), within the range having an upper limit of 40, or 20, or 10, or 5, or 4.5, or 4.0, or 3.2, or 3.0, and a lower limit of 1.5, or 1.8, or 2.0.

Illustrative non-limiting examples of suitable propylene-based elastomers, as well as the methods for preparing them, include the "FPC" disclosed in pending U.S. Provisional Patent Application No. 60/519,975; the "isotactic propylene copolymer" disclosed in U.S. Patent Application Publication No. 2003/0204017; the "propylene ethylene copolymers" disclosed in U.S. Pat. No. 6,525,157; and the "propylene ethylene copolymers" disclosed in PCT Publication No. WO02/083754, the disclosures of which are hereby fully incorporated herein by reference.

Separate from, or in combination with the foregoing, the crystallinity of the propylene-based elastomer can be reduced also by stereo-irregular incorporation of the propylene-derived units, which can be influenced by, for example, the choice of catalyst and polymerization temperature.

The propylene-based elastomers of the present invention are not limited by any particular polymerization method of preparation, and the polymerization processes described herein are not limited by any particular type of reaction vessel.

In a particular embodiment, the catalyst system used to produce the propylene-based elastomer includes one or more transition metal compounds and one or more activators. When alumoxane or aluminum alkyl activators are used, the combined pre-catalyst-to-activator molar ratio is generally from 1:5000 to 10:1. When ionizing activators are used, the combined pre-catalyst-to-activator molar ratio is generally from 10:1 to 1:10. Multiple activators may be used, including using mixtures of alumoxanes or aluminum alkyls with ionizing activators.

In another particular embodiment, the catalyst system includes a bis(cyclopentadienyl) metal compound and either (1) a non-coordinating compatible anion activator, or (2) an alumoxane activator. Non-limiting examples of catalyst systems which can be used are described in U.S. Pat. Nos. 5,198,401 and 5,391,629, which are hereby incorporated herein by reference.

In another embodiment, the propylene-based elastomer is made in the presence of an activating cocatalyst which is a precursor ionic compound comprising a halogenated tetra-aryl-substituted Group 13 anion wherein each aryl substituent contains at least two cyclic aromatic rings. In a particular aspect of this embodiment, the propylene-based elastomer contains greater than 0.2 parts per million, or greater than 0.5 parts per million, or greater than 1 part per million, or greater than 5 parts per million of the residues of the activating cocatalyst.

In another particular embodiment, the catalyst system used to produce the propylene-based elastomer includes a Hf-containing metallocene catalyst, such as but not limited to dimethyl silyl bis(indenyl) hafnium dimethyl, and a non-coordinating anion activator, such as but not limited to dimethyl anilinium tetrakis(heptafluoronaphthyl) borate.

In yet another particular embodiment, the propylene-based elastomer is produced using any of the catalyst systems and polymerization methods disclosed in U.S. Patent Application Publication 2004/0024146, the disclosure of which is hereby incorporated herein by reference.

In yet another particular embodiment, the propylene-based elastomer is produced using a catalyst system such as one of the nonmetallocene, metal-centered, heteroaryl ligand catalyst systems described in U.S. Patent Application Publication 2003/0204017, the disclosure of which is hereby incorporated herein by reference.

Further general process condition information suitable for use in preparing the propylene-based elastomer can be found in disclosures including, but not limited to U.S. Pat. No. 5,001,205 and PCT publications WO96/33227 and WO97/22639. Further information on gas phase polymerization processes can be found in disclosures including, but not limited to U.S. Pat. Nos. 4,543,399; 4,588,790; 5,028,670; 5,317,036; 5,352,749; 5,405,922; 5,436,304; 5,453,471; 5,462,999; 5,616,661; 5,627,242; 5,665,818; 5,668,228; and 5,677,375, and European publications EP-A-0 794 200; EP-A-0 802 202; and EP-B-634 421. Information relating to methods of introducing liquid catalyst systems into fluidized bed polymerizations into a particle lean zone can be found in disclosures including, but not limited to U.S. Pat. No. 5,693,727. Further information on slurry polymerization processes can be found in disclosures including, but not limited to U.S. Pat. Nos. 3,248,179 and 4,613,484. PCT publication WO 96/08520 and U.S. Pat. No. 5,712,352 are non-limiting examples of disclosures which describe a polymerization process operated in the absence of or essentially free of any scavengers.

Crystalline Polymer Component

Some embodiments of the invention include a crystalline propylene polymer component. The crystalline polymer component may be selected from: propylene homopolymer, propylene copolymer, and mixtures thereof which are commonly known as reactor copolymers or impact copolymers. In embodiments where the crystalline polymer component includes a propylene copolymer, the propylene copolymer may be a graft copolymer, block copolymer, or random copolymer.

The amount of propylene-derived units present in the crystalline polymer component is 90 wt % or higher, or 92 wt % or higher, or 95 wt % or higher, or 97 wt % or higher, or 100 wt %, based on the total weight of the crystalline polymer component.

In one embodiment, the crystalline polymer component includes a random copolymer of propylene and at least one comonomer selected from one or more of: ethylene and $C_4$-$C_{12}$ alpha-olefins. In a particular aspect of this embodiment, the amount of comonomer is within the range having an upper limit of 9 wt %, or 8 wt %, or 6 wt %, and a lower limit of 2 wt %, based on the total weight of the crystalline polymer component.

The crystalline polymer component of the invention has a melting point by DSC of at least 110° C., or at least 115° C., or at least 130° C., and a heat of fusion, as determined by DSC, of at least 60 J/g, or at least 70 J/g, or at least 80 J/g.

The crystalline polymer component of the invention has a weight average molecular weight ($M_w$) within the range having an upper limit of 5,000,000 g/mol, or 500,000 g/mol, and a lower limit of 10,000 g/mol, or 50,000 g/mol, and a molecular weight distribution $M_w/M_n$ (MWD), sometimes referred to as a "polydispersity index" (PDI), within the range having an upper limit of 40 and a lower limit of 1.5.

The invention is not limited by any particular method for preparing the crystalline polymer component. In one embodiment, the crystalline polymer component may be a propylene homopolymer obtained by a well known process for the homopolymerization of propylene in a single stage or multiple stage reactor. In another embodiment, the crystalline polymer component may be a propylene copolymer obtained by a well known process for copolymerizing propylene and one or more comonomers in a single stage or multiple stage reactor.

Polymerization methods for preparing the crystalline polymer component include high pressure, slurry, gas, bulk, solution phase, and combinations thereof. Catalyst systems that can be used include traditional Ziegler-Natta catalysts and single-site metallocene catalyst systems. In one embodiment, the catalyst used has a high isospecificity.

Polymerization of the crystalline polymer component may be carried out by a continuous or batch process and may include the use of chain transfer agents, scavengers, or other such additives well known to those skilled in the art. The crystalline polymer component may also contain additives such as flow improvers, nucleators, and antioxidants which are normally added to isotactic polypropylene to improve or retain properties.

Ethylene-based Polymer

Some embodiments of the invention include an ethylene-based polymer having no crystallinity or ethylene type crystallinity. The ethylene-based polymer is a copolymer of ethylene, an alpha-olefin, and optionally a diene. The amount of ethylene-derived units in the ethylene-based polymer is 50 mol % or greater. In one embodiment, the ethylene-based polymer is an ethylene-hexene copolymer. In another embodiment the ethylene-based polymer is a polymer of ethylene, propylene, and diene commonly known as EPDM. In a particular aspect of this embodiment, the amount of propylene-derived units in the ethylene-based polymer is 40 mol % or greater.

Blends

In one embodiment, the invention provides a blend composition comprising at least one propylene-based elastomer, and at least one additional component selected from a crystalline propylene-based polymer component and an ethylene-based polymer.

Compositions of the present invention which include at least one propylene-based elastomer, at least one crystalline propylene-based polymer, and optionally an ethylene-based polymer, have a heterogeneous phase morphology consisting of domains of different crystallinities. These domains of different crystallinities differentiate the inventive compositions from commonly available propylene reactor copolymers (i.e., blends of isotactic polypropylene and copolymers of propylene and ethylene), which have a single crystalline phase.

The continuous phase of the heterogeneous blend compositions described herein has amorphous or crystallizable morphology, and contains the propylene-based elastomer and optional ethylene-based polymer. The dispersed phase has crystalline morphology, and contains crystalline propylene-based polymer, optional fillers, and may also contain propylene-based elastomer and ethylene-based polymer in small amounts relative to the continuous phase. The propylene-based elastomer has low crystallinity relative to the crystalline propylene-based polymer component; therefore, the continuous phase of the inventive compositions has low crystallinity relative to the dispersed phase. The low crystallinity continuous phase differentiates the inventive compositions from commonly available propylene impact copolymers, thermoplastic elastomers, thermoplastic vulcanizates, and thermoplastic olefins, which have a highly crystalline continuous phase.

The components of the blend compositions are compatible to the extent that it may not be necessary to add preformed or in-situ formed compatibilizer to attain and retain a fine blend morphology.

The domains of the dispersed phase of the heterogeneous blend compositions described herein are small with an average minimum axis of less than 5 μm. The larger axis of the dispersed phase can be as large as 100 μm.

Additives

As will be evident to those skilled in the art, the compositions of the present invention may comprise other additives in addition to the polymer components. Various additives may be present to enhance a specific property or may be present as a result of processing of the individual components. Additives which may be incorporated include, but are not limited to processing oils, fire retardants, antioxidants, plasticizers, pigments, vulcanizing or curative agents, vulcanizing or curative accelerators, cure retarders, processing aids, flame retardants, tackifying resins, flow improvers, and the like. Antiblocking agents, coloring agents, lubricants, mold release agents, nucleating agents, reinforcements, and fillers (including granular, fibrous, or powder-like) may also be employed. Nucleating agents and fillers may improve the rigidity of the article. The list described herein is not intended to be inclusive of all types of additives which may be employed with the present invention. Those of skill in the art will appreciate that other additives may be employed to enhance properties of the composition. As is understood by those skilled in the art, the compositions of the present invention may be modified to adjust the characteristics of the blend as desired.

The compositions described herein may also contain inorganic particulate fillers, which may improve the mechanical and wear properties of the compositions, particularly in compositions including cured components. The amount of inorganic filler used is typically from 1 to 100 parts by weight of inorganic filler per 100 parts of polymer. The inorganic fillers include particles less than 1 mm in diameter, rods less than 1 cm in length, and plates less than 0.2 $cm^2$ in surface area. Exemplary particulate fillers include carbon black, clays, titanium and magnesium oxides, and silica. In addition, other particulate fillers, such as calcium carbonate, zinc oxide, whiting, and magnesium oxide, can also be used. An example of a rod-like filler is glass fiber. An example of a plate-like filler is mica. The addition of very small particulate fibers, commonly referred to as nanocomposites, is also contemplated. The addition of the fillers may change the properties of the compositions described herein. For example, compositions including inorganic filler may have improved thermal stability and resistance to wear. The addition of white fillers may improve the temperature changes of the hydrocarbon polymers on exposure to sunlight. The addition of fillers beyond a certain level may lead to a dramatic increase in the viscosity and a corresponding decrease in processability. This threshold level is referred to as the percolation threshold. In addition to the increase in viscosity, the percolation threshold is accompanied by an improvement in the elastic properties, and at levels slightly higher than the percolation threshold there is a drop in the elastic recovery of the blend. The percolation threshold is attained at different levels of addition of fillers depending on the type of filler used. Generally, the percolation threshold is attained at lower levels for fillers with a smaller size than for fillers with a larger size.

The compositions described herein may contain process oil in the range of from 0 to 500 parts by weight, or from 2 to 200 parts by weight, or from 5 to 150 parts by weight, or from 10 to 100 parts by weight, per 100 parts of polymer. The addition of process oil in moderate amounts may lower the viscosity and flexibility of the blend while improving the properties of the blend at temperatures near and below 0° C. It is believed that these potential benefits arise by the lowering of the glass transition temperature (Tg) of the blend. Adding process oil to the blend may also improve processability and provide a better balance of elastic and tensile strength. The process oil is typically known as extender oil in rubber applications. Process oils include hydrocarbons having either (a) traces of hetero atoms such oxygen or (b) at least one hetero atom such as dioctyl plithalate, ethers, and polyethers. Process oils have a boiling point to be substantially involatile at 200° C. These process oils are commonly available either as neat solids, liquids, or as physically absorbed mixtures of these materials on an inert support (e.g., clay, silica) to form a free flowing powder. Process oils usually include a mixture of a large number of chemical compounds which may consist of linear, acyclic but branched, cyclic, and aromatic carbonaceous structures. Another family of process oils are certain organic esters and alkyl ether esters having a molecular weight (Mn) less than 10,000. Combinations of process oils may also be used in the practice of the invention. The process oil should be compatible or miscible with the polymer blend composition in the melt, and may be substantially miscible in the propylene-based elastomer at room temperature. Process oils may be added to the blend compositions by any of the conventional means known in the art, including the addition of all or part of the process oil prior to recovery of the polymer, and addition of all or part of the process oil to the polymer as a part of a compounding for the interblending of the propylene-based elastomer. The compounding step may be carried out in a batch mixer, such as a mill, or an internal mixer, such as a Banbury mixer. The compounding operation may also be conducted in a continuous process, such as a twin screw extruder. The addition of process oils to lower the glass transition temperature of blends of isotactic polypropylene and ethylene propylene diene rubber is described in U.S. Pat. Nos. 5,290,886 and 5,397,832, the disclosures of which are hereby incorporated herein by reference.

The addition of process aids, such as a mixture of fatty acid ester or calcium fatty acid soap bound on a mineral filler, to the compositions described herein may help the mixing of the composition and the injection of the composition into a mold. Other examples of process aids are low molecular weight polyethylene copolymer wax and paraffin wax. The amount of process aid used may be within the range of from 0.5 to 5 phr.

Adding antioxidants to the compositions described herein may improve the long term aging. Examples of antioxidants include, but are not limited to quinolein, e.g., trimethylhydroxyquinolein (TMQ); imidazole, e.g., zincmercapto toluyl imidazole (ZMTI); and conventional antioxidants, such as hindered phenols, lactones, and phosphites. The amount of antioxidants used may be within the range of from 0.001 to 5 phr.

Cured Products

In one embodiment, the elastomeric performance properties of the propylene-based elastomer are improved by curing the elastomer to various degrees. In another embodiment, the propylene-based elastomer is cured to various degrees to permit convenient processing. In some embodiments, the propylene-based elastomer includes a diene to facilitate curing and optimal end use performance in various options of formulation and processing. In other embodiments, such as when using radiation to induce curing, the presence of diene in the propylene-based elastomer is optional.

In some embodiments, the degree of curing is measured by the wt % of insolubles in any solvent that dissolves the composition prior to curing. The compositions described herein may be cured to a degree so as to provide at least 2 wt %, or at least 5 wt %, or at least 10 wt %, or at least 20 wt %, or at least 35 wt %, or at least 45 wt %, or at least 65 wt %, or at least 75 wt %, or at least 85 wt %, or less than 95 wt % insolubles.

In some embodiments, the degree of curing is measured by the viscosity ratio. The compositions described herein may be cured to a degree so as to provide a viscosity ratio of from 1 to 10, or from 1.2 to 10.

The cured compositions described herein may have improved elastic recovery from tensile deformation as shown by measuring the tension set. The tension set is the recovery in the dimensions of the sample after uniaxial deformation. Tension set indicates the physical effect of a mechanical distention for a short period of time. Tension set at a particular elongation is abbreviated as $TS_{X\%}$, where X is the elongation. Thus, $TS_{100\%}$, $TS_{200\%}$, $TS_{300\%}$, $TS_{400\%}$, and $TS_{500\%}$ indicate the tension set at 100%, 200%, 300%, 400%, and 500% elongation, respectively. In one embodiment, a composition which includes a cured propylene-based elastomer as described herein may have a $TS_{100\%}$, $TS_{200\%}$, $TS_{300\%}$, $TS_{400\%}$, or $TS_{500\%}$ of less than 95%, or less than 90%, or less than 80%, or less than 70%, or less than 60% of the tension set of the same composition prior to curing.

The cured compositions described herein may have remarkable stress relaxation during tensile deformation. The stress relaxation is the diminution in the force needed to maintain a certain distention in the dimensions of the sample, after uniaxial deformation, during an extended period of time. Stress relaxation indicates the physical effect of a mechanical distention for an extended. Stress relaxation at a particular elongation is abbreviated as $SR_{X\%}$, where X is the elongation. Thus, $SR_{100\%}$, $SR_{200\%}$, and $SR_{300\%}$ indicate the stress relaxation at 100%, 200%, and 300% elongation, respectively. In one embodiment, a composition which includes a cured propylene-based elastomer as described herein may have a $SR_{100\%}$, $SR_{200\%}$, or $SR_{300\%}$ of less than 95%, or less than 90%, or less than 80%, or less than 70%, or less than 60% of the stress relaxation of the same composition prior to curing.

The cured compositions described herein may have a Die C tear strength at least 20% greater, or 40% greater or 100% greater than the corresponding compositions prior to curing the propylene-based elastomer.

The cured compositions described herein may have a smaller stress relaxation by 20%, or 40% or 60% or 80% or 90% or 95% than the corresponding compositions prior to curing the propylene-based elastomer.

One embodiment of the invention includes a blend composition comprising (a) a continuous phase which comprises a propylene-based elastomer and optionally an ethylene-based polymer, and (b) a dispersed phase which comprises a crystalline propylene-based polymer component, wherein at least 2 wt %, or at least 5 wt %, or at least 10 wt %, or at least 20 wt %, or at least 35 wt %, or at least 45 wt %, or at least 65 wt %, or at least 75 wt %, or at least 85 wt %, or less than 95 wt % of the continuous phase is cured, as measured by the wt % of insolubles in any solvent that dissolves the composition prior to curing.

Another embodiment of the invention includes a blend composition comprising (a) a continuous phase which comprises a propylene-based elastomer and optionally an ethylene-based polymer, and (b) a dispersed phase which comprises a crystalline propylene-based polymer component, wherein the continuous phase is cured to a degree such that the viscosity of the cured composition is higher than the viscosity of the composition prior to curing, as shown by the viscosity ratio. For example, the blend composition may be cured to a degree such that the viscosity ratio is from 1 to 10, or from 1.2 to 10.

One embodiment of the invention includes a composition comprising at least one cured propylene-based elastomer, optionally a crystalline propylene-based polymer component, optionally an ethylene-based polymer, and carbon black. Carbon black can be present in an amount within the range having an upper limit of 500, or 250, or 200, or 100, or 50 phr and a lower limit of 1, or 2, or 5, or 25 phr. In a particular aspect of this embodiment, the composition may have a tensile strength, measured in MPa, equal to 40*(Shore A hardness/MI@190° C.)−600+B, where B is at least 0, or at least 2, or at least 4, or at least 10. In another particular aspect of this embodiment, the composition may have a Die C tear strength, measured in kN/m, equal to 15*(Shore A hardness/MI@190° C.)−600+B, where B is at least 2, or at least 5, or at least 10, or at least 15.

One embodiment of the invention includes a composition comprising at least one cured propylene-based elastomer, optionally a crystalline propylene-based polymer component, optionally an ethylene-based polymer, and no filler. In a particular aspect of this embodiment, the composition may have a tensile strength, measured in MPa, equal to 30*(Shore A hardness/MI@190° C.)−300+B, where B is at least 2, or at least 4, or at least 6, or at least 12. In another particular aspect of this embodiment, the composition may have a Die C tear strength, measured in kN/m, equal to 40*(Shore A hardness/MI@190° C.)−400+B, where B is at least 5, or at least 10, or at least 15, or at least 20.

One embodiment of the invention includes a composition comprising at least one cured propylene-based elastomer, optionally a crystalline propylene-based polymer component, optionally an ethylene-based polymer, and a non-black filler. The filler may be white, red, green, blue, yellow or any color other than black. The filler can be present in an amount within the range having an upper limit of 500, or 250, or 200, or 100, or 50 phr and a lower limit of 1, or 2, or 5, or 25 phr. In a particular aspect of this embodiment, the composition may have a tensile strength, measured in MPa, equal to 30* (Shore A hardness/MI@190° C.)−300+B, where B is at least 2, or at least 4, or at least 6, or at least 12. In another particular aspect of this embodiment, the composition may have a Die C tear strength, measured in kN/m, equal to 40*(Shore A hardness/MI@190° C.)−400+B, where B is at least 5, or at least 10, or at least 15, or at least 20.

In one embodiment, the invention provides a cured composition comprising a propylene-based elastomer, a crystalline propylene-based polymer component, and an ethylene-based polymer, wherein the mechanical properties of the cured composition may be improved in comparison to the mechanical properties of the cured ethylene-based polymer alone. For example, the tensile strength (TS) and/or Die C tear strength (TEAR) of the cured blend of a propylene-based elastomer, a crystalline propylene-based polymer component, and an ethylene-based polymer may be at least 10% higher than the TS and TEAR of the ethylene-based polymer alone and satisfies the following relations:

$$TS > TS_{(TPC)} + 0.9 * R * TS_{(FPC+SPC)}$$

$$TEAR > TEAR_{(TPC)} + 0.9 * TS_{(FPC+SPC)}$$

where $TS_{(FPC+SPC)}$ is the tensile strength of the propylene-based elastomer and optional amounts of crystalline propylene-based polymer and $TEAR_{(FPC+SPC)}$ is the Die C tear strength of a propylene-based elastomer and optional amounts of crystalline propylene-based polymer, $TS_{(TPC)}$ is the tensile strength of the ethylene-based polymer and $TEAR_{(TPC)}$ is the Die C tear strength of the ethylene-based polymer, provided that in all of these comparisons the ratio of propylene-based elastomer to crystalline propylene-based polymer is constant.

The compositions described herein may be prepared by any procedure that guarantees an intimate mixture of the polymeric components. Generally, the first step of the process is mixing the polymeric components and optional additives, such as process oil, fillers, colorants, antioxidants, nucleators, and flow improvers using equipment such as, but not limited to a Carver press for melt pressing the components together, internal mixers such as a Banbury mixer or a Brabender mixer for solution or melt blending of the components, and equipment used for continuous mixing procedures including single and twin screw extruders, static mixers, impingement mixers, as well as other machines and processes designed to disperse the components in intimate contact. A complete mixture of the polymeric components is indicated by the uniformity of the morphology of the composition. Such procedures are well known to those of ordinary skill in the art. In one embodiment, the next step is mixing a chemical curative, such as peroxides or sulfur compounds, with the intimate mixture, and then fabricating the intimate mixture including the chemical curative into the final shape of the article and raising the temperature for an extended period of time to allow the curing of the propylene-based elastomer. In another embodiment, the next step is fabricating the intimate mixture into the final shape of the article, and then exposing the fabricated mixture to an external curative agent, such as high energy radiation, to allow curing of the propylene-based elastomer.

The curing systems that may be used in the practice of the invention include one or more of sulfur based curatives, peroxide curatives, resin cure, hydrosilation, labile or migratory cure systems, and high energy radiation. Such curing systems are well known in the art.

When using a chemical curing agent, such as sulfur, sulfur donors, peroxides, and resins, to induce the reaction, the curing agent is generally mixed into the propylene-based elastomer, or the blend comprising the elastomer, prior to the fabrication of the final shape of the article to be made. When using an external agent, such as reactive chemicals and high-energy radiation, to induce the reaction, the propylene-based elastomer, or the blend comprising the elastomer, is fabricated into the final shape of the article to be made prior to contact with the external agent.

Fiber

In one embodiment, the invention provides a fiber comprising a composition described herein. Methods for making the fibers of the invention include those which are well known to those of ordinary skill in the art. Fibers of the invention may have desirable softness and elastic properties and may be used in various applications, for example, continuous filament yarn, bulked continuous filament yarn, staple fibers, melt blown fibers, and spunbound fibers. In a particular aspect of this embodiment, fibers comprising a composition described herein may have one or both of the following advantages: 1) may be easily spun into fibers by extrusion through a spinneret followed by drawing to the desired denier, and 2) the ability to spin the fibers, as measured by the rate of spinning, may be unaffected across a wide blend composition range, even when the melt flow rate (MFR) of the blends is slowly decreased by the addition of the crystalline propylene-based polymer to the propylene-based elastomer. The constancy of the spinning rate across a wide blend composition range is particularly unanticipated since the spinning rate is sensitive to the MFR of the polymer (or polymer blend), and low MFR polymers have poorer spinning performance.

In one embodiment, the elastic recovery, stress relaxation, and tensile recovery properties of the fibers of the invention may be enhanced by annealing and/or mechanical orientation. Annealing partially relieves the internal stress in the stretched fiber and restores the elastic recovery properties of the blend in the fiber. Annealing has been shown to lead to significant changes in the internal organization of the crystalline structure and the relative ordering of the amorphous and semicrystalline phases, which leads to recovery of the elastic properties. The fiber may be annealed at a temperature of at least 40° F. above room temperature, or at least 20° F. above room temperature, but slightly below the crystalline melting point of the blend composition. Thermal annealing is conducted by maintaining the polymer fiber at a temperature of from room temperature to 160° C., or 130° C., for a period of from 5 minutes to 7 days. A typical annealing period is 3 days at 50° C. or 5 minutes at 100° C. The annealing time and temperature can be adjusted for any particular polymer fiber by experimentation. It is believed that during this annealing process, there is intermolecular rearrangement of the polymer chains, leading to a material with greater recovery from tensile deformation than the unannealed material. Annealing of the fiber is done in the absence of mechanical orientation, however, mechanical orientation can be a part of the annealing process, e.g., after the extrusion operation.

Mechanical orientation can be done by the temporary, forced extension of the polymer fiber for a short period of time before it is allowed to relax in the absence of extensional forces. It is believed that the mechanical orientation of the fiber leads to reorientation of the crystallizable portions of the fiber. Oriented polymer fibers are conducted by maintaining the polymer fibers at an extension of 100% to 700% for a period of 0.1 seconds to 24 hours. A typical orientation is an extension of 200% for a momentary period at room temperature.

For orientation of a fiber, the polymeric fiber at an elevated temperature, but below the crystalline melting point of the polymer, is passed from a feed roll of fiber around two rollers driven at different surface speeds and finally to a take-up roller. The driven roller closest to the take-up roll is driven faster than the driven roller closest to the feed roll, such that the fiber is stretched between the driven rollers. The assembly may include a roller intermediate the second roller and take-up roller to cool the fiber. The second roller and the take-up roller may be driven at the same peripheral speeds to maintain the fiber in the stretched condition. If supplementary cooling is not used, the fiber will cool to ambient temperature on the take-up roller.

In one embodiment, the invention provides fabrics made with the fibers of the invention. The fabrics may be made by any of the known processes for making non-woven or woven fabrics.

Film

In one embodiment, the invention provides a film comprising a composition described herein. Methods for making the films of the invention include those which are well known to those of ordinary skill in the art, including, but not limited to conventional tubular extrusion, or a blown bubble process, and cast extrusion. The extrusion temperatures, die temperatures, and chill roll temperatures are dependent on the composition employed, but will generally be within the following ranges for the compositions described herein: melt temperature, 350° F. to 450° F.; die temperature, 350° F. to 450° F.; and chill roll temperature, 70° F. to 130° F. The film-making process may also include embossing rolls to chill and form the film.

The films of the invention may have a layer adhered to one or both sides of the inventive film. The layers may be adhered by coextrusion of the inventive film with the optional additional layer or layers. In coextruded films, the individual layers are different in composition and retain their composition except at the interface layer. The optional additional layer may be, for example, a soft material such as an ethylene propylene copolymer elastomer which may reduce the adhesive (i.e., sticky) feel of the inventive film. The optional additional layer may also be, for example, a thermoplastic. A thermoplastic layer may be used, for example, as a mechanical support for an elastic film to prevent sag, and as a barrier to adhesion of the polymer film to other surfaces. A thermoplastic layer may become a part of the integral use of an elastic film in that the composite film is stretched beyond the yield point of the thermoplastic layer, e.g., greater than 50% elongation, and allowed to retract due to the elastic forces of the elastic film. In this use, the thermoplastic film is wrinkled to yield a desirable surface finish of the composite elastic film. The thermoplastics that may be used for this purpose include, but are not limited to polypropylene and polyethylene.

In one embodiment, the mechanical properties, such as elastic recovery and stress relaxation, of films of the invention may be enhanced by thermal annealing and/or mechanical orientation.

Thermal annealing is conducted by maintaining the polymer blend or article made from the blend at a temperature between room temperature and 160° C. for a period of from 5 minutes to 7 days. A typical annealing period is 3 days at 50° C. or 5 minutes at 100° C. The annealing time and temperature can be adjusted for any particular blend composition by experimentation. It is believed that during this annealing process, there is intermolecular rearrangement of the polymer chains, leading to a material with greater recovery from tensile deformation than the unannealed material.

Mechanical orientation can be done by the temporary, forced extension of the blend along one or more axis for a short period of time before it is allowed to relax in the absence of extensional forces. It is believed that the mechanical orientation of the polymer leads to reorientation of the crystallizable portions of the blend. Orientation is conducted by maintaining the polymer blend or article made from the blend at an extension of 10% to 400% for a period of 0.1 seconds to 24 hours. A typical orientation is an extension of 200% for a momentary period (generally less than 1 minute) at room temperature.

Orientation of a film may be carried out in the machine direction (MD) or the transverse direction (TC) or both directions (biaxially) using conventional equipment and processes. For orientation in the MD, a polymeric film at an elevated temperature, but below the crystalline melting point of the polymer, is passed from a feed roll of film around two rollers driven at different surface speeds and finally to a take-up roller. The driven roller closest to the take-up roll is driven faster than the driven roller closest to the feed roll, such that the film is stretched between the driven rollers. The assembly may include a roller intermediate the second roller and take-up roller to cool the film. The second roller and the take-up roller may be driven at the same peripheral speeds to maintain the film in the stretched condition. If supplementary cooling is not used, the film will cool to ambient temperature on the take-up roller. The degree of stretch will depend on the relative peripheral speeds of the driven rollers and the distance between the rollers. Stretch rates of 50 to 500 percent/minute will be satisfactory for most MD orientation applications.

For orientation in the TD, the film orientation is carried out in a tentering device. The film is cast or unwound from a film roll and then gripped by the edges for processing through the orientation steps. The film is passed successively through a preheat step, a stretching step at elevated temperatures (e.g., from 100° F. to a temperature slightly below the crystalline melting point of the ethylene crystallizable copolymer), an annealing step, and finally a cooling step. During the steps of preheating and stretching and a portion of the annealing step, the temperature is controlled at an elevated temperature, but below the crystalline melting point of the polymer. Tension may be maintained on the film during the annealing and cooling steps to minimize shrinkback. Upon cooling to ambient temperature, i.e., room temperature, or near ambient, the holding force may be released. The film may contract somewhat (snapback) in the TD, but will retain a substantial portion of its stretched length. The tenter operating conditions can vary within relatively wide ranges and will depend on the several variables including, for example, film composition, film thickness, degree of orientation desired, and annealing conditions.

As indicated earlier, the orientation process may include an annealing step. Annealing partially relieves the internal stress in the stretched film and dimensionally stabilizes the film for storage. Annealing may be carried out in a time and temperature dependent relationship.

In a particular process for film orientation, an interdigitating grooved roller assembly is used to simultaneously produce a desirable crinkled surface finish and orient the film. Such a process is described in U.S. Pat. No. 4,368,565, the disclosure of which is hereby incorporated herein by reference. In this process, the film is stretched between two interlocking grooved rollers which are able to both biaxially stretch the film and orient it.

The fibers, films, and molded objects of the invention, in addition to the final fabrics, forms, and shapes are sterilizable by steam or other high temperature processes where the final temperature is below 250° C. without significant distortion of the shape or significant loss of mechanical properties. The fibers, films, and molded objects of the invention, in addition to the final fabrics, forms, and shapes are also launderable with hot water at temperatures less than 100° C. and detergents without significant distortion of the shape or significant loss of mechanical properties.

Definitions and Test Methods

Comonomer content: The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, vol. 47, pp. 1128-1130.

In the particular case of propylene-ethylene copolymers containing greater than 75 wt % propylene, the comonomer content can be measured as follows. A thin homogeneous film is pressed at a temperature of about 150° C. or greater, and mounted on a Perkin Elmer PE 1760 infrared spectrophotometer. A full spectrum of the sample from 600 cm$^{-1}$ to 4000 cm$^{-1}$ is recorded and the monomer weight percent of ethylene can be calculated according to the following equation: Ethylene wt %=82.585−111.987X+30.045X$^2$, where X is the ratio of the peak height at 1155 cm$^{-1}$ and peak height at either 722 cm$^{-1}$ or 732 cm$^{-1}$, whichever is higher.

Polyene content: The amount of polyene present in a polymer can be inferred by the quantitative measure of the amount of the pendant free olefin present in the polymer after polymerization. Several procedures such as iodine number and the determination of the olefin content by H$^1$ or $^{13}$C nuclear magnetic resonance (NMR) have been established. In embodiments described herein where the polyene is ENB, the amount of polyene present in the polymer can be measured using ASTM D3900.

Isotactic: The term "isotactic" is defined herein as a polymer sequence in which greater than 50% of the pairs of pendant methyl groups located on adjacent propylene units, which are inserted into the chain in a regio regular 1,2 fashion and are not part of the backbone structure, are located either above or below the atoms in the backbone chain, when such atoms in the backbone chain are all in one plane. Certain combinations of polymers in blends or polymer sequences within a single polymer are described as having "substantially the same tacticity," which herein means that the two polymers are both isotactic according to the definition above.

Tacticity: The term "tacticity" refers to the stereoregularity of the orientation of the methyl residues from propylene in a polymer. Pairs of methyl residues from contiguous propylene units identically inserted which have the same orientation with respect to the polymer backbone are termed "meso" (m). Those of opposite configuration are termed "racemic" (r). When three adjacent propylene groups have methyl groups with the same orientation, the tacticity of the triad is 'mm'. If two adjacent monomers in a three monomer sequence have the same orientation, and that orientation is different from the relative configuration of the third unit, the tacticity of the triad is 'mr'. When the middle monomer unit has an opposite configuration from either neighbor, the triad has 'rr' tacticity. The fraction of each type of triad in the polymer can be determined and when multiplied by 100 indicates the percentage of that type found in the polymer.

The triad tacticity of the polymers described herein can be determined from a $^{13}$C nuclear magnetic resonance (NMR) spectrum of the polymer as described below and as described in U.S. Pat. No. 5,504,172, the disclosure of which is hereby incorporated herein by reference.

Tacticity Index: The tacticity index, expressed herein as "m/r", is determined by $^{13}$C nuclear magnetic resonance (NMR). The tacticity index m/r is calculated as defined in H. N. Cheng, *Macromolecules*, 17, 1950 (1984). An m/r ratio of 1.0 generally describes a syndiotactic polymer, and an m/r ratio of 2.0 generally describes an atactic material. An isotactic material theoretically may have a ratio approaching infinity, and many by-product atactic polymers have sufficient isotactic content to result in ratios of greater than 50.

Melting point and heat of fusion: The melting point (Tm) and heat of fusion of the polymers described herein can be determined by Differential Scanning Calorimetry (DSC), using the ASTM E-794-95 procedure. About 6 to 10 mg of a sheet of the polymer pressed at approximately 200° C. to 230° C. is removed with a punch die and annealed at room temperature for 48 hours. At the end of this period, the sample is placed in a Differential Scanning Calorimeter (Perkin Elmer Pyris Analysis System and cooled to about −50° C. to −70° C. The sample is heated at about 20° C./min to attain a final temperature of about 180° C. to 200° C. The term "melting point," as used herein, is the highest peak among principal and secondary melting peaks as determined by DSC, discussed above. The thermal output is recorded as the area under the melting peak of the sample, which is typically at a maximum peak at about 30° C. to about 175° C. and occurs between the temperatures of about 0° C. and about 200° C. The thermal output is measured in Joules as a measure of the heat of fusion. The melting point is recorded as the temperature of the greatest heat absorption within the range of melting of the sample.

Molecular weight and molecular weight distribution: The molecular weight and molecular weight distribution of the polymers described herein can be measured as follows. Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight Mz/Mw.

Mz, Mw, and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975) 287-368; Rodriguez, F., *Principles of Polymer Systems 3rd ed.*, Hemisphere Pub. Corp., NY, (1989) 155-160; U.S. Pat. No. 4,540,753; Verstrate et al., *Macromolecules*, vol. 21, (1988) 3360; and references cited therein.

Tension set: Tension set can be measured according to the general ASTM D790 procedure by uniaxially deforming a sample to different elongations.

Stress relaxation: Stress relaxation can be measured using the following procedure. The sample is mounted on an Instron 4465 tester and elongated to 200% elongation. The load at this elongation is measured as L1. The sample is maintained at this extension for 30 seconds and the new load at the end of the 30 seconds is measured as L1$_{30}$. The relaxation (R1) of the film is measured as 100×(L1−L1$_{30}$)/L1, and is expressed as a percentage. The sample is returned to the initial elongation of 0%. The sample is then elongated to 200% elongation. The load at this elongation is measured as L2. The sample is maintained at this extension for 30 seconds and the new load at the end of the 30 seconds is measured as $L2_{30}$. The relaxation (R2) of the film is measured as $100 \times (L2-L2_{30})/L2$, and is expressed as a percentage. The sample is returned to the initial elongation of 0%. The elongation at which the load on the sample is zero on the second cycle is noted as the set %. The hysteresis in the sample is designated as $100 \times (L1-L2)/L1$, and is expressed as a percentage.

Stress strain measurements: The stress-strain elongation properties of the cured compounds described herein can be measured according to the ASTM D790 procedure described as follows. Dumbbell shaped samples were fabricated into a cured pad molded into dimensions of 6 in×6 in and removed with a die. The stress strain evaluation of the samples was conducted on an Instron 4465 tester determined for blends at 20 in/min, made by Instron Corporation of Canton, Mass. The digital data was collected in a file collected by the Series IX Material Testing System available from Instron Corporation and analyzed using Excel, a spreadsheet program available from Microsoft Corporation of Redmond, Wash.

PHR: The term "phr" is used herein to mean parts per hundred rubber or parts per hundred elastomeric polymer.

Extraction in refluxing xylene: Solubility in refluxing xylene is a measurement of the amount of insoluble and unextractible propylene-based elastomer and optional ethylene-based polymer in compositions containing cured propylene-based elastomer and cured ethylene-based polymer (if present). The process for determining solubility in xylene is as follows. A sample having a thin section, i.e., less than 0.5 in, and weighing approximately 2 grams is weighed, and the weight is recorded as $W_1$. The sample is exposed to 50 ml of refluxing xylene in an extraction apparatus. The temperature of the sample is maintained at or near 140° C. by the refluxing solvent. After 24 hours of extraction, the solvent is decanted off and 50 ml of new solvent is added and the extraction is conducted under identical conditions for another 24 hours. At the end of this period, the sample is removed and dried in a vacuum oven at 100° C. for 24 hours. The sample is then cooled and weighed for a final weight which is recorded as $W_2$. The fraction of the polymer insoluble in xylene at reflux is determined by the following formula: % crosslinked (also referred to herein as % cured), by extraction=$100 \times [W_2(1-F_{Fi})]/[W_1(1-F_S-F_P-F_{Fi})]$, where $F_S$ is the weight fraction of crystalline polymer component present in the composition, $F_P$ is the weight fraction of plasticizer, process oil, and other low molecular weight materials present in the composition which are extractible in refluxing xylene, and $F_{Fi}$ is the weight fraction of filler and other inorganic material present in the composition which are normally inextractible in refluxing xylene.

Solvent swell at ambient temperature: Solvent swell at ambient temperature measures the amount of solvent absorption at room temperature of a composition containing cured propylene-based elastomer. The process for determining solvent swell at ambient temperature is as follows. A sample having a thin section, i.e., less than 0.5 in, and weighing approximately 2 grams is weighed, and the weight is recorded as $W_3$. The sample is exposed to 50 ml of IRM 903 oil in an immersion apparatus. The temperature of the sample is maintained at near ambient. After 70 hours of immersion, the oil is decanted off and the sample is washed momentarily with hexane. The is then dried in a vacuum oven at 80° C. for 24 hours. The sample is then cooled and weighed for a final weight which is recorded as $W_4$. The solvent swell at ambient temperature (SSA) is determined by the following formula: $SSA=100 \times (W_4-W_3)/W_3$.

Solvent swell at elevated temperature: Solvent swell at ambient temperature measures the amount of solvent absorption at an elevated temperature of a composition containing cured propylene-based elastomer. The process for determining solvent swell at elevated temperature is as follows. A sample having a thin section, i.e., less than 0.5 in, and weighing approximately 2 grams is weighed, and the weight is recorded as $W_5$. The sample is exposed to 50 ml of IRM 903 oil in an immersion apparatus. The temperature of the sample is maintained at 70° C. After 70 hours of immersion, the oil is decanted off and the sample is washed momentarily with hexane. The is then dried in a vacuum oven at 80° C. for 24 hours. The sample is then cooled and weighed for a final weight which is recorded as $W_6$. The solvent swell at elevated temperature (SSS) is determined by the following formula: $SSS=100 \times (W_6-W_5)/W_5$.

Die C tear: Die C tear properties are reported in lb/in according to the ASTM D624 version 00 procedure. The data herein is for peak force and the average of three samples is reported as the average data. The original data may be multiplied by 0.175 to convert the units from lb/in to kN/m.

Trouser tear: Trouser tear properties are reported in lb/in according to the ASTM D624 version 00 procedure. The data herein is for peak force and the average of three samples is reported as the average data. The original data may be multiplied by 0.175 to convert the units from lb/in to kN/m.

Mooney viscosity: Mooney viscosity, as used herein, is measured as ML(1+4) @125° C. according to ASTM DI 646.

Melt flow rate and melt index The determination of the Melt Flow rate (MFR) and the Melt Index of the polymer is according to ASTM D1238 using modification 1 with a load of 2.16 kg. In this version of the method a portion of the sample extruded during the test was collected and weighed. The sample analysis is conducted at 230° C. with a 1 minute preheat on the sample to provide a steady temperature for the duration of the experiment. This data expressed as dg of sample extruded per minute is indicated as MFR. In an alternative procedure, the test is conducted in an identical fashion except at a temperature of 190 C. This data is referred to as MI@190 C.

Shore A and Shore D hardness The determination of the Shore A and Shore D hardness of the polymer is according to ASTM D 2240. In this version of the method a portion of the sample is tested at room temperature. The data is recorded 15 seconds after the indentation is created in the sample.

Isotacticity Index: The isotacticity index is calculated according to the procedure described in EP 0374695A2. The IR spectra of a thin film of the material is recorded and the absorbance at 997 $cm^{-1}$ and the absorbance at 973 $cm^{-1}$ are determined. The quotient of the absorbance at 997 $cm^{-1}$ to the absorbance at 973 $cm^{-1}$ is multiplied by 100 to yield the isotacticity index. In the determination of the absorbance at these two positions the position of zero absorbance is the absorbance when there is no analytical sample present in the sample beam.

Viscosity ratio: Rheological experiments were performed on the samples before and after irradiation. Experiments were performed on a Rheomterics ARES Rheometer using parallel plate geometry using 25 mm diameter plates. Small amplitude oscillatory shear measurements were performed at 190° C. and 20% strain from 0.1 to 100 rad/s. The ratio of the viscosity of the samples at 0.1 rad/s after radiation to that before radiation is taken to be the viscosity ratio.

EXAMPLES

Sunpar 150 is a process oil available from Sunoco Inc, Philadelphia, Pa.

Translink 37 is a surface treated kaolin clay from Engelhard Corportaion, Iselin, N.J.

V2504, V3666, V404, ESC 4292, Achieve 3854, and EMPR 103 are polyolefins available from ExxonMobil Chemical Co, Houston, Tex.

Irganox 1076 is an antioxidant available from Novartis Corporation.

Example 1

Synthesis of an Elastomer Having Isotactic Polypropylene Crystallinity and Including a Diene (VNB)

Polymerization was conducted in a 3.8 Liter continuous stirred tank polymerization reactor fitted with one feed port for a mixture of ethylene, propylene, and diene dissolved in a mixture of hexanes and another feed port for a feed of catalysts. The diene used in this example is 5-vinyl-2-norbornene (VNB). The contents of the reactor were agitated at 750 rpm with a pitched blade twin propeller agitator. The polymerization was conducted with no gradients of composition, of either the reactants or the products, or temperature within different zones of the polymerization environment. The temperature of the polymerization was maintained using refrigeration of the feed. Polymerization was initiated using an essentially equimolar mixture of catalyst racemic dimethylsilyl bis(indenyl) hafnium dimethyl and activator dimethylaniliniumtetrakis (pentafluorophenyl)borate. A solution of triethyl aluminum (TEA) dissolved in hexane was added to the polymerization mixture to act as a scavenger for adventitious moisture and oxygen. The scavenger feed is expressed in the table below as the molar ratio of the scavenger to catalyst. Representative, steady-state samples of the resulting polymer were collected and analyzed after at least 4 residence times at any polymerization condition. The polymerization conditions are shown in Table 1-1 and the polymerization results are shown in Table 1-2.

TABLE 1-1

| Sample # | Ethylene Feed (Kg/hr) | Propylene feed (Kg/hr) | VNB (Kg/hr) | TEA (Mol/mol catalyst) | Catalyst feed (Gms/hr) | Hexane feed (Kg/hr) | Residence time (min) | Reactor Temp (° C.) |
|---|---|---|---|---|---|---|---|---|
| 1-1 | 0.71 | 12.53 | 0.014 | 57 | 0.000461 | 32.29 | 9.3 | 38 |
| 1-2 | 0.83 | 12.98 | 0.025 | 27 | 0.0005 | 31.6 | 9.2 | 55 |
| 1-3 | 1.17 | 18.23 | 0.081 | 74 | 0.000178 | 16.84 | 17.2 | 26 |
| 1-4 | 0.82 | 12.98 | 0.043 | 47 | 0.000282 | 31.88 | 9.4 | 38 |
| 1-5 | 0.83 | 12.92 | 0.085 | 30 | 0.000446 | 31.64 | 9.5 | 38 |
| 1-6 | 2.04 | 13.05 | 0.082 | 31 | 0.000424 | 31.49 | 9.6 | 24 |

TABLE 1-2

| | Polymerization | | Composition | | |
|---|---|---|---|---|---|
| Sample # | Rate, Kg/hr | Concentration (g/100 g solv) | Ethylene Wt % | VNB Wt % | Mooney ML(1 + 4)125° C. |
| 1-1 | 1.764 | 4.82 | 7.7 | 0.2 | 26.5 |
| 1-2 | 4.147 | 11.53 | 7.5 | 0.1 | not measured |
| 1-3 | 0.681 | 3.39 | 8.6 | 0.1 | 32.4 |
| 1-4 | 1.964 | 5.41 | 8 | 0.1 | 25.1 |
| 1-5 | 2.511 | 6.97 | 8.3 | 0.4 | 26.7 |
| 1-6 | 1.891 | 5.21 | 16.4 | 0.2 | 33.1 |

Example 2

Radiation Curing of Elastomer

The propylene-based elastomer ("FPC") used in example 2 contains 15.3 wt % ethylene-derived units, the balance being propylene-derived units, has an MFR@230° C. of 5.3, and was made according to the experimental procedure described both in example 1 above and EP 1 223 191, the disclosure of which is hereby incorporated herein by reference.

The crystalline polymer component ("SPC") used in example 2 is Escorene 4292, a homoisotactic polypropylene having an MFR@230° C. of 1.5, available from ExxonMobil Chemical Co. of Houston, Tex.

The ethylene-based polymer ("TPC") used in example 2 is Exact 3024, an ethylene-hexene copolymer having a MI@190° C. of 4.5 and density of 0.905 g/cc, available from ExxonMobil Chemical Co. of Houston, Tex.

The amount of polymeric components used in each sample of example 2 is given in Table 2-1. Samples were prepared according to the following procedure. Compositions containing FPC only (examples 2-1 through 2-5) were compression molded to the required geometry. Blends of FPC and TPC (examples 2-6 through 2-10) were made by mixing in a Brabender intensive mixer for 3 minutes at a controlled temperature between 185° C. and 220° C. High shear roller blades were used for the mixing. Blends of FPC and SPC (examples 2-11 through 2-15) were prepared in a Haake twin-screw extruder at temperatures ranging from 190° C. to 220° C.

The blends were then removed and pressed out into films of 0.004" thickness in a 4 in×4 in mold at 200° C. for 3 to 5 minutes. At the end of this period, the films were cooled and removed and allowed to anneal for 14 days at room temperature prior to further experimentation.

Each of the samples was then irradiated with γ radiation from a cobalt-60 source to different doses, as shown in Table 2-1, under ambient conditions (room temperature and 1 atmosphere). The degree of curing of the samples was estimated using the following extraction procedure. About 0.4 grams of each sample was enclosed in a 400-mesh stainless steel screen pouch and extracted in boiling xylene for 20 hours. Then, the mesh pouches were pulled above the solvent level and were washed with refluxing xylene for several hours. After washing, the pouches were dried in a vacuum oven until the weight remained constant (minimum of 4 hours) at 50° C., and were cooled to room temperature prior to weighing. The wt % of insoluble material in each sample was calculated using the following equation:

$$\% \text{ curing} = 100 \times (W_3 - W_1)/(W_2 - W_1)$$

where $W_1$=weight of the empty stainless steel pouch, $W_2$=weight of the sample+pouch before extraction, and $W_3$=weight of the sample+pouch after extraction. The % insolubles after extraction is used as an indicator of curing.

Rheological experiments were performed on the samples before and after irradiation. The rheological experiments were performed on a Rheometrics ARES Rheometer using parallel plate geometry using 25 mm diameter plates. Small amplitude oscillatory shear measurements were performed at 190° C. and 20% strain from 0.1 to 100 rad/s. The ratio of the viscosity of the samples at 0.1 rad/s after radiation to that before radiation is shown in the table below. The viscosity of samples 2-3 through 2-5 and 2-8 through 2-10 was not measured because the film samples could not be molded into specimens for the rheological experiments due to extensive curing. We expect that for these extensively cured samples, the viscosity after radiation is much greater than the viscosity prior to radiation.

TABLE 2-1

| Sample # | wt % FPC | wt % SPC | wt % TPC | Radiation Min Dose (kGy) | Radiation Max Dose (kGy) | Insolubles (%) | Viscosity Ratio @ 0.1 rad/s |
|---|---|---|---|---|---|---|---|
| 2-1 | 100 | 0 | 0 | 0 | 0 | 0.2 | 1 |
| 2-2 | 100 | 0 | 0 | 22.5 | 22.6 | 0.2 | 4.1 |
| 2-3 | 100 | 0 | 0 | 45.6 | 46.1 | 24.8 | not measured |
| 2-4 | 100 | 0 | 0 | 73.6 | 74.4 | 58.3 | not measured |
| 2-5 | 100 | 0 | 0 | 99.4 | 100.6 | 68.1 | not measured |
| 2-6 | 80 | 0 | 20 | 0 | 0 | 0.1 | 1 |
| 2-7 | 80 | 0 | 20 | 22.5 | 22.6 | 0.0 | 6.9 |
| 2-8 | 80 | 0 | 20 | 45.6 | 46.1 | 47.9 | not measured |
| 2-9 | 80 | 0 | 20 | 73.6 | 74.4 | 62.5 | not measured |
| 2-10 | 80 | 0 | 20 | 99.4 | 100.6 | 72.6 | not measured |
| 2-11 | 80 | 20 | 0 | 0 | 0 | 0.4 | 1 |
| 2-12 | 80 | 20 | 0 | 22.5 | 22.6 | 0.4 | 1.3 |
| 2-13 | 80 | 20 | 0 | 45.6 | 46.1 | 0.5 | 1.8 |
| 2-14 | 80 | 20 | 0 | 73.6 | 74.4 | 0.5 | 2.3 |
| 2-15 | 80 | 20 | 0 | 99.4 | 100.6 | 0.8 | 3.0 |

Example 3

Synthesis of an Elastomer Having Isotactic Polypropylene Crystallinity and Including a Diene (ENB)

Polymerization was conducted as follows. In a 27 liter continuous flow stirred tank reactor equipped with a dual pitch blade turbine agitator, 92 Kg of dry hexane, 34 Kg of propylene, 1.8 Kg of ethylene, 1.1 Kg of 5-ethylidene-2-norbornene (ENB) were added per hour. The reactor was agitated at 650 rpm during the course of the reaction and was maintained liquid full at 1600 psi pressure (gauge) so that all regions in the polymerization zone had the same composition during the entire course of the polymerization. A catalyst solution in toluene of 1.5610-3 grams of dimethylsilylindenyl dimethyl hafnium and 2.4210-3 grams of dimethylanilinium tetrakis (heptafluoronaphthyl) borate was added at a rate of 6.35 ml/min to initiate the polymerization. An additional solution of tri-n-octyl aluminum (TNOA) was added to remove extraneous moisture during the polymerization. The polymerization was conducted at 59° C. and the temperature was maintained during the polymerization by adding pre-chilled hexane at a temperature between −3° C. and 2° C. The polymerization was efficient and led to the formation of 9.5 Kg of polymer per hour. The polymer was recovered by two stage removal of the solvent, first by removing 70% of the solvent using a lower critical solution process as described in WO0234795A1, and then removing the remaining solvent in a LIST devolatization extruder. The polymer was recovered as pellets about a ⅛ to ¼ inch in principal axes. The polymer was analyzed to contain 12.4 wt % ethylene, 2.34 wt % of incorporated ENB, and had a ML (1+4) @125° C. of 22.

The polymerization conditions of additional samples of this polymerization are shown in Table 3-1, and Table 3-2 shows the polymerization results.

The catalyst feed in Table 3-1 contains $5.77 \times 10^{-4}$ Mol/L of the catalysts in toluene, and the activator feed contains $3.74 \times 10^{-4}$ Mol/L of the activator in toluene. Both feeds are introduced into the polymerization reactor after an initial premixing for about 60 seconds at the rates indicated below.

TABLE 3-1

| Sample # | Ethylene Feed (Kg/hr) | Propylene feed (Kg/hr) | ENB (Kg/hr) | TNOA (Mol/mol catalyst) | Catalyst feed (Cc/min) | Activator feed (Cc/min) | Hexane feed (Kg/hr) | Reactor Temp (° C.) |
|---|---|---|---|---|---|---|---|---|
| 3-1 | 1.44 | 28.4 | 0.47 | 0.4 | 6.35 | 6.35 | 97.0 | 72 |
| 3-2 | 1.56 | 32.9 | 0.48 | 0.4 | 2.55 | 2.55 | 92.7 | 67 |
| 3-3 | 1.60 | 33.7 | 0.51 | 0.4 | 2.62 | 2.62 | 92.2 | 62 |
| 3-4 | 1.66 | 33.3 | 0.59 | 0.4 | 2.80 | 2.80 | 92.1 | 63 |
| 3-5 | 1.83 | 33.3 | 0.84 | 0.4 | 3.05 | 3.05 | 92.3 | 62 |
| 3-6 | 1.93 | 33.6 | 1.00 | 0.4 | 3.61 | 3.61 | 92.0 | 59 |
| 3-7 | 1.85 | 33.8 | 1.16 | 0.5 | 4.20 | 4.20 | 92.1 | 55 |
| 3-8 | 1.65 | 32.9 | 1.33 | 0.8 | 5.78 | 5.78 | 93.2 | 55 |
| 3-9 | 1.62 | 33.1 | 1.33 | 0.8 | 6.30 | 6.30 | 93.4 | 52 |

TABLE 3-2

| Sample # | Polymerization rate (Kg/hr) | Polymer analysis |||
|---|---|---|---|---|
| | | wt % Ethylene | wt % Diene | Mooney ML(1 + 4) @ 125° C. |
| 3-1 | 11.6 | 11.01 | 1.58 | 17.2 |
| 3-2 | 10.8 | 10.56 | 1.45 | 9.8 |
| 3-3 | 10.0 | 10.79 | 1.3 | 16.3 |
| 3-4 | 9.9 | 10.75 | 1.23 | 23.8 |
| 3-5 | 9.8 | 11.24 | 1.43 | 23.3 |
| 3-6 | 9.6 | 13.07 | 2.04 | 22.1 |
| 3-7 | 8.8 | 12.2 | 2.08 | 23.3 |
| 3-8 | 8.0 | 12.73 | 2.4 | 24.4 |
| 3-9 | 7.2 | 12.6 | 2.82 | 16.5 |

Polymer samples 3-1 through 3-9 were then analyzed as follows. A total of at least 72 g of the polymer was homogenized in a Brabender intensive mixture for 3 minutes at a controlled temperature between 180° C. and 220° C. High shear roller blades were used for the mixing and approximately 0.4 g of Irganox 1076 was added to the blend. At the end of the mixing, the mixture was removed and pressed out into a 6"×6" mold into a pad 0.25" thick at 215° C. for 3 to 5 minutes. At the end of this period, the pad was cooled for 2.5 minutes and removed and allowed to anneal for 40 to 48 hours. Test specimens of the required dumbbell geometry were removed from this pad and evaluated on an Instron tester to produce the data shown in Table 3-3.

TABLE 3-3

| Sample # | Youngs Modulus (psi) | 50% Modulus (psi) | 100% Modulus (psi) | 200% Modulus (psi) | 500% Modulus (psi) | Ultimate Elong. (%) | Ultimate tensile (psi) | Tension set from 100% elongation 2nd pull (%) |
|---|---|---|---|---|---|---|---|---|
| 3-1 | 127854 | 630 | 584 | 598 | 1022 | 805 | 2509 | 9.6 |
| 3-2 | 150012 | 676 | 615 | 611 | 1070 | 817 | 2707 | 14.1 |
| 3-3 | 158364 | 671 | 612 | 637 | 1129 | 791 | 2739 | 11.1 |
| 3-4 | 154358 | 700 | 638 | 640 | 1157 | 786 | 2752 | 19.1 |
| 3-5 | 119633 | 625 | 580 | 578 | 1109 | 772 | 2676 | 8.2 |
| 3-6 | 57080 | 489 | 487 | 486 | 933 | 752 | 2264 | 4.6 |
| 3-7 | 30802 | 431 | 445 | 452 | 884 | 738 | 2203 | 3.2 |
| 3-8 | 28090 | 394 | 416 | 419 | 748 | 789 | 1992 | 3.8 |
| 3-9 | 39323 | 387 | 413 | 418 | 683 | 798 | 1715 | 3.9 |

The intermolecular solubility distribution and intermolecular composition distribution of the polymers were measured by the procedures described herein, and the results are give in Table 3-4.

TABLE 3-4

| Sample # | Fraction soluble at 23° C. || Fraction soluble at 31° C. ||
|---|---|---|---|---|
| | Wt % | wt % Ethylene | Wt % | wt % Ethylene |
| 3-1 | 47 | 11.3 | 53 | 10.7 |
| 3-2 | 56 | 10.5 | 46 | 11.0 |
| 3-3 | 62 | 10.8 | 38 | 10.5 |
| 3-4 | 44 | 10.5 | 56 | 11.0 |
| 3-5 | 77 | 11.0 | 23 | 11.6 |

TABLE 3-4-continued

| Sample # | Fraction soluble at 23° C. || Fraction soluble at 31° C. ||
|---|---|---|---|---|
| | Wt % | wt % Ethylene | Wt % | wt % Ethylene |
| 3-6 | 81 | 13.1 | 19 | 13.5 |
| 3-7 | 93 | 12.6 | 7 | 13.0 |
| 3-8 | 100 | 12.8 | 0 | * |
| 3-9 | 100 | 12.3 | 0 | * |

* not measured

The melting point and heat of fusion of the samples were measured by the DSC procedures described herein. In Table 3-5 below, the melting point data indicates the principal peak as the first number, and the approximate position of the tallest secondary peak as the second number. The mm %, tacticity index (m/r), and 1.3 insertion % were determined using the $^{13}$C NMR spectrum of the samples, and the isotacticity index of the samples was determined using the IR spectra of the polymers. The results are given in Table 3-5.

TABLE 3-5

|  | DSC | | ¹³C NMR | | | IR |
|---|---|---|---|---|---|---|
| Sample # | Melting Point(° C.) | Heat of Fusion (J/g) | mm % | m/r | 1.3 insertion % | Isotacticity index |
| 3-1 | 45/67 | 29.5 | 90.1 | 7.1 | 0.098 | 47.75 |
| 3-2 | 44/68 | 32.9 | 91.3 | 6.2 | 0.12 | 48.72 |
| 3-3 | 45/67 | 32.4 | 91.8 | 6.9 | 0.086 | 51.18 |
| 3-4 | 45/67 | 33.8 | 90.6 | 7.7 | 0.13 | 50.81 |
| 3-5 | 45/64 | 32.4 | 90.1 | 7.1 | 0.098 | 49.62 |
| 3-6 | 45/62 | 23.4 | 91.3 | 6.2 | 0.12 | 45.76 |
| 3-7 | 45/61 | 19.5 | 91.8 | 6.9 | 0.086 | 42.48 |
| 3-8 | 45/61 | 22.5 | 90.6 | 7.7 | 0.13 | 44.23 |
| 3-9 | 44/62 | 19.7 | 90.1 | 7.1 | 0.098 | 45.19 |
| Comparative V 404 | | | | | | 0 |
| Comparative ESC 4292 | | | | | | 83.54 |

Example 4

Compounding and Vulcanization of Elastomer with Non-black Fillers

The ingredients according to Table 4-1 were blended in a Brabender mixer operating at about 50 rpm at a temperature of from 180 to 200° C. with 1000 ppm Irganox 1076 for 5 to 7 minutes until a smooth mixture was obtained and all ingredients were well dispersed. The blended compound was removed, and a small sample was analyzed for viscosity by measuring the MFR@230° C. From the remaining portion of the sample, 220 g was compounded with 8 g zinc oxide, 4 g stearic acid, 3 g sulfur, 3 g 2-mercaptobenzothiazyl disulfide (MBTS), and 3 g tetramethyl thiuram monosulfide (TMTMS) on a roll mill. This compound was then rolled out into a smooth sheet. This compounded material was then vulcanized at 170° C. for 30 minutes in the form of a compression molded pad suitable for subsequent analyses. Samples of the appropriate geometry were removed from the vulcanized pad to yield the results shown in Table 4-1 below.

TABLE 4-1

| | Sample # | | | | | | | | |
|---|---|---|---|---|---|---|---|---|---|
| | 4-1 | 4-2 | 4-3 | 4-4 | 4-5 | 4-6 | 4-7 | 4-8 | 4-9 |
| Compounding | | | | | | | | | |
| Sample 3-5 (g) | 250 | 210 | 170 | 240 | 200 | 160 | 230 | 190 | 150 |
| Sample 3-8 (g) | 0 | 0 | 0 | 0 | 0 | 0 | 0 | 0 | 0 |
| Achieve 3854 (g) | 0 | 0 | 0 | 10 | 10 | 10 | 20 | 20 | 20 |
| Sunpar 150 (g) | 0 | 10 | 20 | 0 | 10 | 20 | 0 | 10 | 20 |
| Translink 37 (g) | 0 | 30 | 60 | 0 | 30 | 60 | 0 | 30 | 60 |
| Unvulcanized Properties | | | | | | | | | |
| MFR @ 230° C. | 2.9 | 3.32 | 3.73 | 3.43 | 3.47 | 4.52 | 3.7 | 4.24 | 5.02 |
| Vulcanized Properties | | | | | | | | | |
| Hardness | | | | | | | | | |
| Hardness Shore A | 82 | 83 | 85 | 83 | 85 | 84 | 88 | 88 | 83 |
| Hardness Shore D | 36 | 34 | 33 | 34 | 32 | 40 | 38 | 37 | 39 |
| DSC | | | | | | | | | |
| Heat of fusion (J/g) | 17.2 | 18.6 | 4.6 | 27.9 | 9.8 | 7.3 | 32.7 | 27.8 | 19.2 |
| Tm (° C.) | 44 | 47 | 43 | 42 | 49 | 49 | 44 | 45 | 45 |
| Secondary peak (° C.) | 62 | 57 | 67 | 63 | 67 | 68 | 64 | 70 | 65 |
| Tear | | | | | | | | | |
| Die C (lb/in) @ room temperature | 341 | 354 | 344 | 377 | 383 | 348 | 403 | 388 | 377 |
| Trouser (lb/in) @ room temperature | 272 | 271 | 292 | 278 | 305 | 314 | 354 | 331 | 386 |
| Tensile-Elongation | | | | | | | | | |
| Mod at 50% (psi) | 701 | 720 | 685 | 763 | 755 | 879 | 804 | 855 | 865 |
| Mod at 100% (psi) | 682 | 721 | 710 | 738 | 760 | 943 | 769 | 850 | 878 |
| Mod at 200% (psi) | 674 | 725 | 745 | 721 | 775 | 1052 | 759 | 872 | 917 |
| Mod at 500% (psi) | 1236 | 1304 | 1274 | 1232 | 1246 | NA | 1224 | 1462 | 1419 |
| Max Elong (%) | 747 | 742 | 774 | 781 | 797 | 455 | 822 | 806 | 737 |
| Max tensile (psi) | 2866 | 2674 | 2472 | 2731 | 2562 | 2168 | 2673 | 3095 | 2302 |

TABLE 4-1-continued

| Vulcanization | | | | | | | | | |
|---|---|---|---|---|---|---|---|---|---|
| FIPX (%) | 95 | 92 | 88 | 94 | 90 | 89 | 90 | 90 | 87 |
| SSA (%) | 8.5 | 7.3 | 6.4 | 6.9 | 5.9 | 5.1 | 5.4 | 5.0 | 4.0 |
| SSS (%) | 284 | 245 | 187 | 246 | 190 | 163 | 269 | 166 | 130 |

| | Sample # | | | | | | | | |
|---|---|---|---|---|---|---|---|---|---|
| | 4-10 | 4-11 | 4-12 | 4-13 | 4-14 | 4-15 | 4-16 | 4-17 | 4-18 |
| Compounding | | | | | | | | | |
| Sample 3-5 (g) | 0 | 0 | 0 | 0 | 0 | 0 | 0 | 0 | 0 |
| Sample 3-8 (g) | 250 | 210 | 170 | 240 | 200 | 160 | 230 | 190 | 150 |
| Achieve 3854 (g) | 0 | 0 | 0 | 10 | 10 | 10 | 20 | 20 | 20 |
| Sunpar 150 (g) | 0 | 10 | 20 | 0 | 10 | 20 | 0 | 10 | 20 |
| Translink 37 (g) | 0 | 30 | 60 | 0 | 30 | 60 | 0 | 30 | 60 |
| Unvulcanized Properties | | | | | | | | | |
| MFR @ 230° C. | 2.93 | 3.08 | 4.62 | 3.11 | 3.82 | 6.72 | 6.08 | 6.22 | 8.09 |
| Vulcanized Properties | | | | | | | | | |
| Hardness | | | | | | | | | |
| Hardness Shore A | 87 | 85 | 86 | 89 | 84 | 84 | 76 | 77 | 84 |
| Hardness Shore D | 34 | 33 | 33 | 33 | 30 | 35 | 28 | 28 | 35 |
| DSC | | | | | | | | | |
| Heat of fusion (J/g) | 29.0 | 23.4 | 19.3 | 24.3 | 22.3 | 8.5 | 22.6 | 17.2 | 7.0 |
| Tm (° C.) | 43 | 44 | 43 | 45 | 44 | 52 | 49 | 46 | 50 |
| Secondary peak (° C.) | 63 | 68 | 69 | 60 | 72 | 56 | 76 | 63 | 67 |
| Tear | | | | | | | | | |
| Die C (lb/in) @ room temperature | 333 | 349 | 339 | 374 | 270 | 378 | 296 | 299 | 293 |
| Trouser (lb/in) @ room temperature | 298 | 264 | 277 | 315 | 137 | 300 | 203 | 141 | 142 |
| Tensile-Elongation | | | | | | | | | |
| Mod at 50% (psi) | 675 | 684 | 697 | 745 | 554 | 761 | 565 | 592 | 618 |
| Mod at 100% (psi) | 658 | 684 | 731 | 728 | 626 | 765 | 599 | 638 | 678 |
| Mod at 200% (psi) | 640 | 692 | 764 | 717 | 707 | 777 | 632 | 704 | 759 |
| Mod at 500% (psi) | 1101 | 1204 | 1254 | 1187 | 1285 | 1276 | 1144 | 1318 | 1298 |
| Max Elong (%) | 778 | 774 | 837 | 808 | 742 | 792 | 739 | 661 | 726 |
| Max tensile (psi) | 2657 | 2637 | 2922 | 2951 | 2544 | 2608 | 2391 | 2148 | 2265 |
| Vulcanization | | | | | | | | | |
| FIPX (%) | 93 | 92 | 89 | 93 | 85 | 91 | 90 | 89 | 85 |
| SSA (%) | 4.9 | 8.1 | 6.4 | 7.5 | 11.9 | 6.0 | 12.9 | 11.1 | 8.8 |
| SSS (%) | 354 | 212 | 184 | 292 | 136 | 178 | 213 | 154 | 117 |

Example 5

Compounding and Vulcanization of Elastomer with Black Fillers

The ingredients according to Table 5-1 were blended in a Brabender mixer operating at about 50 rpm at a temperature of from 180 to 200° C. with 1000 ppm Irganox 1076 for 5 to 7 minutes until a smooth mixture was obtained and all ingredients were well dispersed. The blended compound was removed, and a small sample was analyzed for viscosity by measuring the MFR@230° C. From the remaining portion of the sample, 220 g was compounded with 8 g zinc oxide, 4 g stearic acid, 3 g sulfur, 3 g MBTS, and 3 g TMTMS on a roll mill. This compound was then rolled out into a smooth sheet. This compounded material was then vulcanized at 170° C. for 30 minutes in the form of a compression molded pad suitable for subsequent analyses. Samples of the appropriate geometry were removed from the vulcanized pad to yield the results shown in Table 5-1 below.

TABLE 5-1

| | Sample # | | | | | | | | |
|---|---|---|---|---|---|---|---|---|---|
| | 5-1 | 5-2 | 5-3 | 5-4 | 5-5 | 5-6 | 5-7 | 5-8 | 5-9 |
| Compounding | | | | | | | | | |
| Sample 3-5 (g) | 250 | 210 | 170 | 240 | 200 | 160 | 230 | 190 | 150 |
| Sample 3-8 (g) | 0 | 0 | 0 | 0 | 0 | 0 | 0 | 0 | 0 |

TABLE 5-1-continued

| | | | | | | | | | |
|---|---|---|---|---|---|---|---|---|---|
| Achieve 3854 (g) | 0 | 0 | 0 | 10 | 10 | 10 | 20 | 20 | 20 |
| Sunpar 150 (g) | 0 | 10 | 20 | 0 | 10 | 20 | 0 | 10 | 20 |
| N330 (g) | 0 | 30 | 60 | 0 | 30 | 60 | 0 | 30 | 60 |
| *Unvulcanized Properties* | | | | | | | | | |
| MFR @ 230° C. | 2.87 | 2.34 | 3.21 | 1.0 | 2.57 | 0.93 | 3.69 | 2.57 | 1.27 |
| *Vulcanized Properties* | | | | | | | | | |
| Hardness | | | | | | | | | |
| Hardness Shore A | * | * | * | * | * | * | * | * | * |
| Hardness Shore D | 29 | 33 | 35 | 31 | 34 | 36 | 36 | 36 | 37 |
| DSC | | | | | | | | | |
| Heat of fusion (J/g) | 34.6 | 34.1 | 29.7 | 16.1 | 19.5 | 20.9 | 10 | 9.3 | 9.4 |
| Tm (° C.) | 45 | 48 | 45 | 51 | 51 | 47 | 54 | 56 | 54 |
| Secondary peak (° C.) | 70 | 64 | 67 | 68 | 63 | 69 | 67 | 65 | 68 |
| Tear | | | | | | | | | |
| Die C (lb/in) @ room temperature | 325 | 359 | 385 | 363 | 393 | 423 | 390 | 424 | 436 |
| Trouser (lb/in) @ room temperature | 289 | 299 | 313 | 297 | 321 | 308 | 319 | 341 | 343 |
| Tensile-Elongation | | | | | | | | | |
| Mod at 50% (psi) | 607 | 628 | 636 | 675 | 672 | 747 | 740 | 803 | 830 |
| Mod at 100% (psi) | 607 | 643 | 676 | 672 | 695 | 800 | 733 | 815 | 872 |
| Mod at 200% (psi) | 601 | 683 | 766 | 671 | 751 | 932 | 744 | 878 | 993 |
| Mod at 500% (psi) | 1018 | 1279 | 1399 | 1109 | 1299 | 1611 | 1203 | 1487 | 1587 |
| Max Elong (%) | 801 | 811 | 804 | 817 | 846 | 794 | 798 | 812 | 819 |
| Max tensile (psi) | 2621 | 3476 | 2742 | 2623 | 3153 | 2786 | 2487 | 3010 | 2763 |
| Vulcanization | | | | | | | | | |
| FIPX (%) | 91 | 90 | 88 | 92 | 87 | 86 | 89 | 88 | 84 |
| SSA (%) | 7.6 | 7.3 | 6.1 | 7.4 | 6.5 | 5.4 | 6.4 | 5.4 | 4.5 |
| SSS (%) | 357 | 215 | 186 | 264 | 192 | 153 | 255 | 155 | 138 |

| | Sample # | | | | | | | |
|---|---|---|---|---|---|---|---|---|
| | 5-10 | 5-11 | 5-12 | 5-13 | 5-14 | 5-15 | 5-16 | 5-17 | 5-18 |
| *Compounding* | | | | | | | | | |
| Sample 3-5 (g) | 0 | 0 | 0 | 0 | 0 | 0 | 0 | 0 | 0 |
| Sample 3-8 (g) | 250 | 210 | 170 | 240 | 200 | 160 | 230 | 190 | 150 |
| Achieve 3854 (g) | 0 | 0 | 0 | 10 | 10 | 10 | 20 | 20 | 20 |
| Sunpar 150 (g) | 0 | 10 | 20 | 0 | 10 | 20 | 0 | 10 | 20 |
| N330 (g) | 0 | 30 | 60 | 0 | 30 | 60 | 0 | 30 | 60 |
| *Unvulcanized Properties* | | | | | | | | | |
| MFR @ 230° C. | 4.43 | 3.91 | 1.26 | 5.07 | 4.12 | 1.66 | 4.28 | 3.76 | 1.81 |
| *Vulcanized Properties* | | | | | | | | | |
| Hardness | | | | | | | | | |
| Hardness Shore A | 82 | 85 | 85 | 84 | 85 | * | 85 | * | * |
| Hardness Shore D | 24 | 26 | 30 | 27 | 29 | 33 | 30 | 36 | 40 |
| DSC | | | | | | | | | |
| Heat of fusion (J/g) | 28.7 | 11 | 15.6 | 22.4 | 19.1 | 5.2 | 20.8 | 9.1 | 10.4 |
| Tm (° C.) | 47 | 54 | 47 | 45 | 47 | 55 | 46 | 54 | 53 |
| Secondary peak (° C.) | 64 | 71 | 65 | 74 | 65 | 67 | 68 | 68 | 69 |
| Tear | | | | | | | | | |
| Die C (lb/in) @ room temperature | 248 | 286 | 305 | 276 | 312 | 333 | 295 | 341 | 352 |
| Trouser (lb/in) @ room temperature | 149 | 133 | 123 | 147 | 133 | 144 | 121 | 159 | 160 |
| Tensile-Elongation | | | | | | | | | |
| Mod at 50% (psi) | 390 | 432 | 465 | 459 | 515 | 573 | 524 | 597 | 638 |
| Mod at 100% (psi) | 442 | 491 | 563 | 509 | 592 | 681 | 577 | 672 | 768 |
| Mod at 200% (psi) | 488 | 572 | 741 | 553 | 705 | 877 | 637 | 803 | 1016 |
| Mod at 500% (psi) | 982 | 1151 | 1541 | 966 | 1389 | 1662 | 1228 | 1543 | 1847 |
| Max Elong (%) | 662 | 738 | 652 | 716 | 691 | 665 | 696 | 688 | 627 |
| Max tensile (psi) | 1886 | 2568 | 2356 | 1961 | 2544 | 2370 | 2416 | 2536 | 2450 |

TABLE 5-1-continued

| Vulcanization | | | | | | | | | |
|---|---|---|---|---|---|---|---|---|---|
| FIPX (%) | 91 | 87 | 84 | 88 | 86 | 83 | 89 | 86 | 84 |
| SSA (%) | 19.8 | 16.1 | 12.6 | 17.2 | 13.2 | 9.5 | 13.8 | 10.7 | 9.3 |
| SSS (%) | 241 | 202 | 150 | 228 | 170 | 128 | 101 | 146 | 120 |

*not measured

Example 6

Compounding and Vulcanization of Elastomer with Black Fillers, Non-black Fillers, and High Tg tackifiers The ingredients according to Table 6-1 were blended in a Brabender mixer operating at about 50 rpm at a temperature of from 180 to 200° C. with 1000 ppm Irganox 1076 for 5 to 7 minutes until a smooth mixture was obtained and all ingredients were well dispersed. The blended compound was removed, and a small sample was analyzed for viscosity by measuring the MFR@230° C. From the remaining portion of the sample, 220 g was compounded with 8 g zinc oxide, 4 g stearic acid, 3 g sulfur, 3 g MBTS, and 3 g TMTMS on a roll mill. This compound was then rolled out into a smooth sheet. This compounded material was then vulcanized at 170° C. for 30 minutes in the form of a compression molded pad suitable for subsequent analyses. Samples of the appropriate geometry were removed from the vulcanized pad to yield the results shown in Table 6-1 below.

Example 7

Compounding and Vulcanization of Elastomer with Black Fillers, Non-Black Fillers, and EPDM The ingredients according to Table 7-1 were blended in a Brabender mixer operating at about 50 rpm at a temperature of from 180 to 200° C. with 1000 ppm Irganox 1076 for 5 to 7 minutes until a smooth mixture was obtained and all ingredients were well dispersed. The blended compound was removed, and a small sample was analyzed for viscosity by measuring the MFR@230° C. From the remaining portion of the sample, 220 g was compounded with 8 g zinc oxide, 4 g stearic acid, 3 g sulfur, 3 g MBTS, and 3 g TMTMS on a roll mill. This compound was then rolled out into a smooth sheet. This compounded material was then vulcanized at 170° C. for 30 minutes in the form of a compression molded pad suitable for subsequent analyses. Samples of the appropriate geometry were removed from the vulcanized pad to yield the results shown in Table 7-1 below.

TABLE 6-1

| | Sample # | | | | | | | | | | | |
|---|---|---|---|---|---|---|---|---|---|---|---|---|
| | 6-1 | 6-2 | 6-3 | 6-4 | 6-5 | 6-6 | 6-7 | 6-8 | 6-9 | 6-10 | 6-11 | 6-12 |
| | Compounding | | | | | | | | | | | |
| Example 3-5 (g) | 170 | 160 | 150 | 0 | 0 | 0 | 170 | 160 | 150 | 0 | 0 | 0 |
| Example 3-8 (g) | 0 | 0 | 0 | 170 | 160 | 150 | 0 | 0 | 0 | 170 | 160 | 150 |
| Achieve 3854 (g) | 0 | 10 | 20 | 0 | 10 | 20 | 0 | 10 | 20 | 0 | 10 | 20 |
| EMPR 103 (g) | 20 | 20 | 20 | 20 | 20 | 20 | 20 | 20 | 20 | 20 | 20 | 20 |
| N330 (g) | 60 | 60 | 60 | 60 | 60 | 60 | 0 | 0 | 0 | 0 | 0 | 0 |
| Translink 37 (g) | 0 | 0 | 0 | 0 | 0 | 0 | 60 | 60 | 60 | 60 | 60 | 60 |
| | Unvulcanized Properties | | | | | | | | | | | |
| MFR @ 230° C. | 0.62 | 0.60 | 0.73 | 0.82 | 0.70 | 1.22 | 2.27 | 2.66 | 3.00 | 4.36 | 4.51 | 5.07 |
| | Vulcanized Properties | | | | | | | | | | | |
| Hardness | | | | | | | | | | | | |
| Hardness Shore A | 88 | >90 | >90 | 82 | 87 | 87 | 85 | 85 | 87 | 78 | 82 | 86 |
| Hardness Shore D | 38 | 42 | 42 | 33 | 35 | 38 | 34 | 38 | 40 | 25 | 27 | 33 |
| Tear | | | | | | | | | | | | |
| Die C (lb/in) @ room temperature | 408 | 457 | 450 | 324 | 341 | 371 | 348 | 393 | 387 | 256 | 296 | 318 |
| Trouser (lb/in) @ room temperature | 227 | 236 | 250 | 125 | 145 | 159 | 228 | 251 | 276 | 125 | 166 | 191 |
| Tensile-Elongation | | | | | | | | | | | | |
| Mod at 50% (psi) | 727 | 861 | 944 | 493 | 569 | 656 | 659 | 731 | 830 | 415 | 505 | 513 |
| Mod at 100% (psi) | 745 | 899 | 958 | 564 | 651 | 755 | 695 | 766 | 864 | 473 | 567 | 657 |
| Mod at 200% (psi) | 842 | 1045 | 1068 | 724 | 843 | 980 | 754 | 833 | 927 | 560 | 652 | 775 |
| Mod at 500% (psi) | 1554 | 1754 | 1729 | 1576 | 1746 | 1821 | 1226 | 1330 | 1358 | 1051 | 1081 | 1356 |
| Max Elong (%) | 817 | 783 | 809 | 674 | 703 | 676 | 835 | 780 | 833 | 766 | 844 | 729 |
| Max tensile (psi) | 3076 | 2907 | 2921 | 2643 | 3068 | 2711 | 2849 | 2513 | 2632 | 2418 | 2813 | 2552 |
| Vulcanization | | | | | | | | | | | | |
| SSA (%) | 5.5 | 4.4 | 3.5 | 11.3 | 9.9 | 8.4 | 6.9 | 4.4 | 4.0 | 12.1 | 11.4 | 8.8 |

TABLE 7-1

|  | Sample # | | | | | | | |
|---|---|---|---|---|---|---|---|---|
|  | 7-1 | 7-2 | 7-3 | 7-4 | 7-5 | 7-6 | 7-7 | 7-8 |
| Compounding | | | | | | | | |
| V2504 (g) | 0 | 20 | 50 | 75 | 100 | 125 | 150 | 180 |
| Sample 3-8 (g) | 160 | 145 | 120 | 95 | 70 | 45 | 25 | 0 |
| Achieve 3854 (g) | 16 | 14 | 12 | 9 | 7 | 4 | 2 | 0 |
| Sunpar 150 (g) | 20 | 20 | 20 | 20 | 20 | 20 | 20 | 20 |
| N330 (g) | 60 | 60 | 60 | 60 | 60 | 60 | 60 | 60 |
| Translink 37 (g) | 0 | 0 | 0 | 0 | 0 | 0 | 0 | 0 |
| Unvulcanized Properties | | | | | | | | |
| MFR @ 230° C. | 0.92 | 1.10 | 0.89 | 0.99 | 0.82 | 0.56 | 0.22 | 0.33 |
| Vulcanized Properties | | | | | | | | |
| Hardness | | | | | | | | |
| Hardness Shore A | 88 | 87 | 87 | 82 | 77 | 73 | 70 | 64 |
| Hardness Shore D | 38 | 36 | 35 | 30 | 27 | 26 | 22 | 20 |
| Tear | | | | | | | | |
| Die C (lb/in) @ room temperature | 293 | 300 | 287 | 241 | 260 | 197 | 164 | 124 |
| Trouser (lb/in) @ room temperature | 127 | 93 | 71 | 55 | 51 | 31 | 30 | 23 |
| Tensile-Elongation | | | | | | | | |
| Mod at 50% (psi) | 597 | 573 | 521 | 465 | 366 | 331 | 290 | 256 |
| Mod at 100% (psi) | 709 | 709 | 678 | 685 | 509 | 494 | 480 | 468 |
| Mod at 200% (psi) | 935 | 971 | 976 | 1113 | 817 | 876 | 959 | 989 |
| Mod at 500% (psi) | 1743 | 1935 | 2075 | NA | 841 | NA | NA | NA |
| Max Elong (%) | 616 | 571 | 536 | 331 | 488 | 359 | 250 | 176 |
| Max tensile (psi) | 2227 | 2258 | 2249 | 1730 | 2018 | 1664 | 1254 | 891 |
| Vulcanization | | | | | | | | |
| SSA (%) | 10.7 | 12.4 | 13.1 | 18.5 | 22.2 | 23.9 | 27.2 | 30.8 |
| SSS (%) | 131.5 | 124.8 | 119.7 | 112.0 | 129.1 | 114.6 | 117.8 | 114.9 |

|  | Sample # | | | | | | | |
|---|---|---|---|---|---|---|---|---|
|  | 7-9 | 7-10 | 7-11 | 7-12 | 7-13 | 7-14 | 7-15 | 7-16 |
| Compounding | | | | | | | | |
| V2504 (g) | 0 | 20 | 50 | 75 | 100 | 125 | 150 | 180 |
| Sample 3-8 (g) | 160 | 145 | 120 | 95 | 70 | 45 | 25 | 0 |
| Achieve 3854 (g) | 16 | 14 | 12 | 9 | 7 | 4 | 2 | 0 |
| Sunpar 150 (g) | 20 | 20 | 20 | 20 | 20 | 20 | 20 | 20 |
| N330 (g) | 0 | 0 | 0 | 0 | 0 | 0 | 0 | 0 |
| Translink 37 (g) | 60 | 60 | 60 | 60 | 60 | 60 | 60 | 60 |
| Unvulcanized Properties | | | | | | | | |
| MFR @ 230° C. | 5.78 | 5.13 | 4.29 | 3.40 | 2.49 | 2.01 | 1.83 | 1.35 |
| Vulcanized Properties | | | | | | | | |
| Hardness | | | | | | | | |
| Hardness Shore A | 81 | 84 | 80 | 76 | 72 | 70 | 57 | 55 |
| Hardness Shore D | 31 | 29 | 27 | 25 | 21 | 20 | 13 | 14 |

TABLE 7-1-continued

Tear

| | | | | | | | | |
|---|---|---|---|---|---|---|---|---|
| Die C (lb/in) @ room temperature | 257 | 222 | 199 | 195 | 143 | 131 | 107 | 58 |
| Trouser (lb/in) @ room temperature | 119 | 72 | 52 | 49 | 36 | 43 | 22 | 15 |

Tensile-Elongation

| | | | | | | | | |
|---|---|---|---|---|---|---|---|---|
| Mod at 50% (psi) | 493 | 456 | 407 | 339 | 290 | 291 | 172 | 165 |
| Mod at 100% (psi) | 568 | 542 | 488 | 424 | 373 | 377 | 240 | 242 |
| Mod at 200% (psi) | 665 | 660 | 607 | 551 | 501 | 507 | 351 | 358 |
| Mod at 500% (psi) | 1154 | 1280 | 1367 | 1477 | 870 | 109 | NA | NA |
| Max Elong (%) | 716 | 594 | 559 | 499 | 458 | 414 | 382 | 183 |
| Max tensile (psi) | 1961 | 1673 | 1659 | 1517 | 1322 | 1027 | 588 | 346 |

Vulcanization

| | | | | | | | | |
|---|---|---|---|---|---|---|---|---|
| SSA (%) | | 11.4 | 12.9 | 15.5 | 19.0 | 21.8 | 22.5 | 32.3 | 31.8 |
| SSS (%) | | 127.7 | 124.4 | 129.5 | 129.0 | 129.9 | 127.9 | 135.3 | 123.8 |

Example 8

Fabrication of Cured Fibers, Films, and Molded Objects

The ingredients according to Table 8-1 were blended in a Brabender mixer operating at about 50 rpm at a temperature of from 180 to 200° C. with 1000 ppm Irganox 1076 for 5 to 7 minutes until a smooth mixture was obtained and all ingredients were well dispersed. The blended compound was removed, and a small sample was analyzed for viscosity by measuring the MFR@230° C.

TABLE 8-1

| | Sample # | | | | | | |
|---|---|---|---|---|---|---|---|
| | 8-1 | 8-2 | 8-3 | 8-4 | 8-5 | 8-6 | 8-7 |
| Compounding | | | | | | | |
| Sample 3-8 (g) | 250 | 230 | 210 | 210 | 230 | 210 | 230 |
| Achieve 3854 (g) | 0 | 23 | 42 | 21 | 0 | 21 | 0 |
| Sunpar 150 (g) | 0 | 0 | 0 | 20 | 23 | 0 | 0 |
| N330 (g) | 60 | 60 | 60 | 60 | 60 | 60 | 60 |
| Translink 37 (g) | 0 | 0 | 0 | 0 | 0 | 20 | 23 |

TABLE 8-1-continued

| | Sample # | | | | | | |
|---|---|---|---|---|---|---|---|
| | 8-1 | 8-2 | 8-3 | 8-4 | 8-5 | 8-6 | 8-7 |
| Unvulcanized Properties | | | | | | | |
| MFR @ 230° C. | 4.2 | 4.8 | 5.7 | 8.3 | 7.7 | 4.2 | 3.6 |

Fibers were obtained by extruding the molten mixture at a temperature of about 230° C. through a die with a cylindrical cross-section for the extrudate. The minimum length of the fiber segment was 10 cm. Samples of the fiber segments were cured by exposure for 20 hours to sulphur dichloride in an atmosphere free of moisture at room temperature. The cured fiber segments obtained from Samples 8-1, 8-2, 8-3, 8-4, 8-5, 8-6, and 8-7 are labelled Samples 8-FB1X, 8-FB2X, 8-FB3X, 8-FB4X, 8-FB5X, 8-FB6X, and 8-FB7X, respectively. The fiber samples were analyzed for tensile elongation, solubility, and recovery properties, to yield the results shown in Table 8-2 below.

TABLE 8-2

| Sample # | FIPX (%) | Tension set from 100% elongation (%) | Tension set from 200% elongation (%) | Tension set from 300% elongation (%) | Tension set from 400% elongation (%) | Tension set from 500% elongation (%) | Youngs Modulus (psi) | 50% Modulus (psi) | 100% Modulus (psi) | 200% Modulus (psi) | 500% Modulus (psi) | Ultimate Elong. (%) | Ultimate tensile (psi) |
|---|---|---|---|---|---|---|---|---|---|---|---|---|---|
| 8-1 | dissolved | 17 | 16 | 24 | 59 | 84 | 15273 | 271 | 286 | 310 | 697 | 693 | 1414 |
| 8-2 | dissolved | 14 | 19 | 38 | 82 | 86 | 39068 | 463 | 499 | 559 | 1231 | 713 | 2298 |
| 8-3 | dissolved | 21 | 38 | 58 | 72 | 86 | 72480 | 469 | 483 | 525 | 1042 | 729 | 1963 |
| 8-4 | dissolved | 9 | 24 | 29 | 72 | 62 | 37900 | 383 | 400 | 450 | 974 | 694 | 1749 |
| 8-5 | dissolved | 7 | 10 | 19 | 48 | 48 | 12242 | 262 | 290 | 329 | 713 | 699 | 1357 |
| 8-6 | dissolved | 8 | 29 | 48 | 58 | 67 | 104502 | 549 | 587 | 706 | 1410 | 629 | 2061 |
| 8-7 | | 7 | 14 | 48 | 53 | 53 | 48279 | 345 | 375 | 432 | 1055 | 594 | 1460 |
| 8-FB1X | | 6 | 7 | 8 | 17 | 26 | 11479 | 226 | 301 | 421 | na | 399 | 875 |
| 8-FB2X | | 4 | 5 | 7 | 19 | 26 | 20010 | 321 | 392 | 506 | 1299 | 484 | 1265 |
| 8-FB3X | | 5 | 8 | 18 | 20 | 26 | 34768 | 447 | 530 | 664 | na | 491 | 1671 |
| 8-FB4X | | 2 | 7 | 9 | 14 | 22 | 18198 | 293 | 361 | 466 | 1088 | 494 | 1105 |
| 8-FB5X | | 2 | 2 | 5 | 15 | 15 | 8251 | 213 | 277 | 377 | na | 463 | 836 |
| 8-FB6X | | 3 | 8 | 14 | 18 | 20 | 25161 | 364 | 433 | 540 | 1202 | 535 | 1371 |
| 8-FB7X | | 2 | 5 | 10 | 16 | 15 | 13611 | 284 | 362 | 476 | 1217 | 502 | 1171 |

Films were obtained by compression molding the molten mixture at a temperature of about 230° C. in a flat die. The minimum length and width of the film segment was 10 cm. Samples of the film segments were cured by exposure for 20 hours to sulphur dichloride in an atmosphere free of moisture at room temperature. The cured film segments obtained from Samples 8-1,8-2, 8-3,8-4, 8-5,8-6, and 8-7 are labelled Samples 8-FL1X, 8-FL2X, 8-FL3X, 8-FL4X, 8-FL5X, 8-FL6X, and 8-FL7X, respectively. The film samples were analyzed for tensile elongation, solubility, and recovery properties, to yield the results shown in Table 8-3 below.

Molded objects were obtained by compression molding the molten mixture at a temperature of about 230° C. in a die. Samples of the molded object were cured by exposure for 20 hours to sulphur dichloride in an atmosphere free of moisture at room temperature. The cured molded object obtained from Samples 8-1, 8-2, 8-3, 8-4, 8-5, 8-6, and 8-7 are labelled Samples 8-M1X, 8-M2X, 8-M3X, 8-M4X, 8-M5X, 8-M6X, and 8-M7X, respectively. Specimen tensile bars were removed from the molded object. The specimen tensile bars were analyzed for tensile elongation, solubility, and recovery properties, to yield the results shown in Table 8-4 below.

TABLE 8-3

| Sample # | Tension set from 100% elongation (%) | Tension set from 200% elongation (%) | Tension set from 300% elongation (%) | Tension set from 400% elongation (%) | Tension set from 500% elongation (%) | Youngs Modulus (psi) | 50% Modulus (psi) | 100% Modulus (psi) | 200% Modulus (psi) | 500% Modulus (psi) | Ultimate Elong. (%) | Ultimate tensile (psi) |
|---|---|---|---|---|---|---|---|---|---|---|---|---|
| 8-1 FL | | | | | | 27898 | 474 | 497 | 510 | 1076 | 743 | 2839 |
| 8-2 FL | | | | | | 35774 | 612 | 625 | 681 | 1300 | 776 | 3030 |
| 8-3 FL | | | | | | 98913 | 802 | 802 | 859 | 1559 | 805 | 3499 |
| 8-4 FL | | | | | | 20675 | 549 | 578 | 635 | 1207 | 801 | 2855 |
| 8-5 FL | | | | | | 21077 | 404 | 444 | 476 | 935 | 742 | 2287 |
| 8-6 FL | | | | | | 39109 | 655 | 677 | 739 | 1358 | 795 | 3286 |
| 8-7 FL | | | | | | 35203 | 497 | 528 | 566 | 1170 | 769 | 3326 |
| 8-FL1X | 6 | 8 | 8 | 18 | 28 | 29374 | 232 | 298 | 391 | 888 | 636 | 1901 |
| 8-FL2X | 5 | 6 | 8 | 21 | 29 | 25402 | 384 | 462 | 580 | 1178 | 675 | 2428 |
| 8-FL3X | 6 | 9 | 20 | 23 | 29 | 33361 | 507 | 601 | 737 | 1527 | 582 | 2128 |
| 8-FL4X | 2 | 8 | 10 | 16 | 25 | 18072 | 331 | 404 | 514 | 1001 | 669 | 1840 |
| 8-FL5X | 2 | 3 | 6 | 17 | 17 | 21438 | 252 | 311 | 400 | 807 | 685 | 1827 |
| 8-FL6X | 3 | 8 | 16 | 20 | 23 | 19689 | 488 | 577 | 709 | 1322 | 688 | 2481 |
| 8-FL7X | 2 | 5 | 11 | 17 | 17 | 22018 | 323 | 398 | 501 | 978 | 659 | 1909 |

TABLE 8-4

| Sample # | solubility at room temperature in cyclohexane (%) | Tension set from 100% elongation (%) | Tension set from 200% elongation (%) | Tension set from 300% elongation (%) | Tension set from 400% elongation (%) | Tension set from 500% elongation (%) |
|---|---|---|---|---|---|---|
| 8-1 | dissolved | 18 | 17 | 25 | 61 | 88 |
| 8-2 | dissolved | 15 | 20 | 40 | 85 | 90 |
| 8-3 | dissolved | 22 | 40 | 60 | 75 | 90 |
| 8-4 | dissolved | 9 | 25 | 30 | 75 | 65 |
| 8-5 | dissolved | 7 | 10 | 20 | 50 | 50 |
| 8-6 | dissolved | 8 | 30 | 50 | 60 | 70 |
| 8-7 | dissolved | 7 | 15 | 50 | 55 | 55 |
| 8-FB1X | | 16 | 20 | 22 | 48 | 74 |
| 8-FB2X | | 12 | 15 | 20 | 55 | 75 |
| 8-FB3X | | 15 | 23 | 51 | 59 | 75 |
| 8-FB4X | | 6 | 21 | 25 | 41 | 64 |
| 8-FB5X | | 6 | 7 | 15 | 43 | 43 |
| 8-FB6X | | 8 | 22 | 41 | 51 | 59 |
| 8-FB7X | | 6 | 13 | 29 | 45 | 44 |

| Sample # | Youngs Modulus (psi) | 50% Modulus (psi) | 100% Modulus (psi) | 200% Modulus (psi) | 500% Modulus (psi) | Ultimate Elong. (%) | Ultimate tensile (psi) | SSA (%) |
|---|---|---|---|---|---|---|---|---|
| 8-1 | 21411 | 364 | 384 | 399 | 799 | 755 | 1904 | na |
| 8-2 | 64143 | 509 | 534 | 590 | 995 | 788 | 2225 | na |
| 8-3 | 104516 | 624 | 655 | 734 | 1156 | 810 | 2597 | na |
| 8-4 | 36338 | 409 | 446 | 511 | 880 | 804 | 1905 | na |
| 8-5 | 13595 | 287 | 327 | 363 | 711 | 761 | 1613 | na |
| 8-6 | 77356 | 557 | 599 | 678 | 1075 | 788 | 2424 | na |

TABLE 8-4-continued

| | | | | | | | | |
|---|---|---|---|---|---|---|---|---|
| 8-7 | 27907 | 407 | 446 | 493 | 924 | 749 | 2100 | na |
| 8-FB1X | 42956 | 391 | 427 | 456 | 1126 | 605 | 2027 | 11.5 |
| 8-FB2X | 44873 | 510 | 552 | 624 | 1215 | 660 | 2547 | 10.5 |
| 8-FB3X | 69962 | 611 | 658 | 749 | 1358 | 678 | 2765 | 7.5 |
| 8-FB4X | 29484 | 419 | 471 | 549 | 1045 | 688 | 2120 | 9.9 |
| 8-FB5X | 20725 | 313 | 362 | 407 | 915 | 610 | 1473 | 15.6 |
| 8-FB6X | 53636 | 536 | 585 | 663 | 1204 | 670 | 2347 | 10.3 |
| 8-FB7X | 46586 | 417 | 463 | 508 | 1081 | 600 | 1733 | 11.8 |

Example 9

Compounding and Vulcanization of Elastomer with Black Fillers, Non-Black Fillers, and High Molecular Weight EPDM The ingredients according to Table 9-1 were blended in a Brabender mixer operating at about 50 rpm at a temperature of from 180 to 200° C. with 1000 ppm Irganox 1076 for 5 to 7 minutes until a smooth mixture was obtained and all ingredients were well dispersed. The blended compound was removed, and a small sample was analyzed for viscosity by measuring the MFR@230° C. From the remaining portion of the sample, 220 g was compounded with 8 g zinc oxide, 4 g stearic acid, 3 g sulfur, 3 g MBTS, and 3 g TMTMS on a roll mill. This compound was then rolled out into a smooth sheet. This compounded material was then vulcanized at 170° C. for 30 minutes in the form of a compression molded pad suitable for subsequent analyses. Samples of the appropriate geometry were removed from the vulcanized pad to yield the results shown in Table 9-1 below.

All patents, test procedures, and other documents cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the invention, including all features which would be treated as equivalents thereof by those skilled in the art to which the invention pertains.

When numerical lower limits and numerical upper limits are listed herein, ranges from any lower limit to any upper limit are contemplated.

TABLE 9-1

| | Sample # | | | | | | | | | | | |
|---|---|---|---|---|---|---|---|---|---|---|---|---|
| | 9-1 | 9-2 | 9-3 | 9-4 | 9-5 | 9-6 | 9-7 | 9-8 | 9-9 | 9-10 | 9-11 | 9-12 |
| | Compounding | | | | | | | | | | | |
| Example 3-8 (g) | 140 | 130 | 116 | 120 | 108 | 99 | 140 | 130 | 116 | 120 | 108 | 99 |
| V3666 (g) | 32 | 30 | 27 | 27 | 25 | 23 | 32 | 30 | 27 | 27 | 25 | 23 |
| Achieve 3854 (g) | 14 | 13 | 11 | 12 | 11 | 10 | 14 | 13 | 11 | 12 | 11 | 10 |
| Sunpar 150 (g) | 9 | 28 | 52 | 25 | 23 | 21 | 9 | 28 | 52 | 25 | 23 | 21 |
| N330 (g) | 65 | 60 | 53 | 74 | 92 | 106 | 0 | 0 | 0 | 0 | 0 | 0 |
| Translink 37 (g) | 0 | 0 | 0 | 0 | 0 | 0 | 65 | 60 | 53 | 74 | 92 | 106 |
| | Unvulcanized Properties | | | | | | | | | | | |
| MFR @230° C. | 0.49 | 1.15 | 5.45 | 0.43 | 1.16 | 0.024 | 4.93 | 9.17 | 16.65 | 7.25 | 6.07 | 5.37 |
| | Vulcanized Properties | | | | | | | | | | | |
| Hardness | | | | | | | | | | | | |
| Hardness Shore A | 80 | 75 | 73 | 75 | 81 | 84 | 78 | 75 | 68 | 75 | 78 | 77 |
| Tear | | | | | | | | | | | | |
| Die C (lb/in) @ room temperature | 297 | 254 | 202 | 264 | 262 | 250 | 235 | 198 | 158 | 210 | 204 | 215 |
| Tensile-Elongation | | | | | | | | | | | | |
| Mod at 50% (psi) | 559 | 458 | 342 | 505 | 564 | 704 | 503 | 400 | 293 | 425 | 477 | 515 |
| Mod at 100% (psi) | 702 | 597 | 442 | 677 | 774 | 992 | 578 | 476 | 362 | 507 | 568 | 611 |
| Mod at 200% (psi) | 1010 | 874 | 645 | 1027 | 1201 | 1568 | 691 | 580 | 462 | 616 | 677 | 713 |
| Mod at 500% (psi) | 2210 | 1261 | 1411 | 2187 | 2276 | na | 1443 | 1186 | 1045 | 1248 | 1296 | 1280 |
| Max Elong (%) | 595 | 539 | 630 | 498 | 533 | 391 | 619 | 644 | 615 | 616 | 597 | 598 |
| Max tensile (psi) | 2729 | 2098 | 1926 | 2244 | 2394 | 2184 | 2109 | 1822 | 1506 | 1752 | 1696 | 1634 |
| Vulcanization | | | | | | | | | | | | |
| SSA (%) | 11.1 | 12.8 | 16.9 | 11.4 | 10.9 | 10.9 | 12.9 | 13.9 | 16.7 | 12.9 | 11.3 | 10.0 |

What is claimed is:

1. An elastomer comprising:
   (a) propylene-derived units in an amount of from 80 to 90 wt %, based on the combined weight of components (a), (b), and (c);
   (b) diene-derived units in an amount within the range of from 0.3 to 3 wt %, based on the combined weight of components (a), (b), and (c); and
   (c) ethylene-derived units in an amount of from 10 to 20 wt %, based on the combined weight of components (a), (b), and (c);
   wherein the elastomer has isotactic polypropylene crystallinity, a melting point by DSC of from 0 to 110° C., and a heat of fusion of from 5 J/g to 50 J/g, and wherein the elastomer is partially insoluble and the fractions soluble at 23° C. and 31° C., as measured by the extraction method described herein, have ethylene contents differing by 5 wt % or less.

2. The elastomer of claim 1, wherein the diene is 5-ethylidene-2-norbornene.

3. The elastomer of claim 2, wherein the diene-derived units are present in an amount within the range of from 1 to 3 wt %, based on the combined weight of components (a), (b), and (c).

4. The elastomer of claim 1, wherein the diene is 5-vinyl-2-norbornene.

5. The elastomer of claim 4, wherein the diene-derived units are present in an amount within the range of from 0.5 to 1.5 wt %, based on the combined weight of components (a), (b), and (c).

6. The elastomer of claim 1, wherein the elastomer has a Mooney viscosity ML(1+4) at 125° C. of from 0.5 to 100.

7. The elastomer of claim 1, wherein the elastomer has a Mooney viscosity ML(1+4) at 125° C. of from 5 to 40.

8. The elastomer of claim 1, wherein the elastomer is partially insoluble and the fractions soluble at 23° C. and 31° C., as measured by the extraction method described herein, have ethylene contents differing by 2 wt % or less.

9. The elastomer of claim 1, wherein the elastomer has an isotactic propylene triad tacticity of from 65 to 95%.

10. The elastomer of claim 1, wherein the elastomer has an m/r ratio of from 6 to 8.

11. The elastomer of claim 1, wherein the elastomer has an isotacticity index of from 40 to 55.

12. A curable composition comprising the elastomer of claim 1 and a curing package.

13. The curable composition of claim 12, further comprising an extender oil in an amount of 10 wt % or less, based on the total weight of the composition.

14. The curable composition of claim 12, further comprising an extender oil in an amount of 1 wt % or less, based on the total weight of the composition.

15. The curable composition of claim 12, wherein the composition does not contain an extender oil.

* * * * *